(12) United States Patent
Weaver et al.

(10) Patent No.: US 8,224,495 B2
(45) Date of Patent: Jul. 17, 2012

(54) CONTROL OF POWER GENERATION SYSTEM HAVING THERMAL ENERGY AND THERMODYNAMIC ENGINE COMPONENTS

(75) Inventors: Samuel P. Weaver, Boulder, CO (US); Lee S. Smith, Boulder, CO (US)

(73) Assignee: Cool Energy, Inc., Boulder, CO (US)

( * ) Notice: Subject to any disclaimer, the term of this patent is extended or adjusted under 35 U.S.C. 154(b) by 329 days.

(21) Appl. No.: 12/536,278

(22) Filed: Aug. 5, 2009

(65) Prior Publication Data

US 2011/0030753 A1    Feb. 10, 2011

(51) Int. Cl.
| | |
|---|---|
| *G05B 21/00* | (2006.01) |
| *G05D 3/12* | (2006.01) |
| *F01K 27/00* | (2006.01) |
| *F03G 7/00* | (2006.01) |
| *F03G 6/00* | (2006.01) |
| *F01K 1/00* | (2006.01) |
| *F16D 31/02* | (2006.01) |
| *F28D 15/00* | (2006.01) |
| *B60H 1/00* | (2006.01) |
| *F24D 5/00* | (2006.01) |
| *F24H 9/20* | (2006.01) |
| *B64D 11/00* | (2006.01) |

(52) U.S. Cl. ............ 700/288; 60/413; 60/418; 60/641.1; 60/641.2; 60/641.8; 60/659; 137/828; 237/2 A; 237/2 B; 237/2 R; 165/104.24; 165/236; 700/274; 700/275; 700/276; 700/277; 700/278; 700/286; 700/287; 700/291; 700/295

(58) Field of Classification Search .......... 700/274–278, 700/286–288, 291, 295; 60/641.11, 641.1, 60/641.2, 641.8, 659, 413, 418; 165/104.24, 165/236; 137/828; 237/2 A, 2 B, 2 R
See application file for complete search history.

(56) References Cited

U.S. PATENT DOCUMENTS

| | | | | |
|---|---|---|---|---|
| 4,103,493 | A | * | 8/1978 | Schoenfelder ............. 60/641.11 |
| 4,335,578 | A | * | 6/1982 | Osborn et al. ............... 60/641.8 |

(Continued)

OTHER PUBLICATIONS

Onovwiona et al., "Modeling of Internal Combustion Engine Based Cogeneration Systems for Residential Applications", 2006, Elsevier, p. 846-861.*

(Continued)

*Primary Examiner* — Albert Decady
*Assistant Examiner* — Thomas Stevens
(74) *Attorney, Agent, or Firm* — Patterson & Sheridan, LLP

(57) ABSTRACT

A thermal source provides heat to a heat engine and or one or more thermal demands, including space and water heating and heat storage. Additionally the output of the heat engine may be used for local in situ electricity needs, or directed out over the grid. A system controller monitors conditions of the components of the system, and operates that system in modes that maximize a particular benefit, such as a total accrued desired benefit obtained such as reduced electricity cost, reduced fossil fuel use, maximized return on investment and other factors. The controller may use past history of use of the system to optimize the next mode of operation, or both past and future events such as predicted solar insolation.

25 Claims, 14 Drawing Sheets

U.S. PATENT DOCUMENTS

| | | | | |
|---|---|---|---|---|
| 5,558,273 | A | * | 9/1996 | Swenson et al. ............... 237/2 B |
| 5,924,486 | A | * | 7/1999 | Ehlers et al. .................. 165/238 |
| 6,397,163 | B1 | * | 5/2002 | Hoyt et al. .................... 702/136 |
| 6,536,207 | B1 | * | 3/2003 | Kamen et al. .................. 60/39.6 |
| 6,691,526 | B2 | * | 2/2004 | Gether et al. ................. 62/238.7 |
| 2003/0233201 | A1 | * | 12/2003 | Horst et al. ..................... 702/62 |
| 2006/0053794 | A1 | * | 3/2006 | Licari et al. ..................... 60/698 |
| 2006/0055175 | A1 | * | 3/2006 | Grinblat .......................... 290/54 |
| 2008/0250788 | A1 | * | 10/2008 | Nuel et al. ................. 60/641.14 |
| 2009/0093916 | A1 | * | 4/2009 | Parsonnet et al. ............. 700/286 |
| 2009/0267540 | A1 | * | 10/2009 | Chemel et al. ................ 315/297 |

OTHER PUBLICATIONS

CSIRO Australia (Jan. 22, 2009). 'Smart' Fridges Stay Cool by Talking to Each Other. ScienceDaily. Retrieved Apr. 16, 2010, from http://www.sciencedaily.com/releases/2009/01/090121093351.htm, 2 pages.

Plataforma SINC (Nov. 19, 2008). New System Proposed to Optimize Combined Energy Use. ScienceDaily. Retrieved Apr. 16, 2010, from http://www.sciencedaily.com/releases/2008/11/081113111343.htm, 2 pages.

* cited by examiner

| Mode in First Segment | 3 | | | | | 6 | | | | | 7 | | | | |
|---|---|---|---|---|---|---|---|---|---|---|---|---|---|---|---|
| Length of First Segment, hours | 0.30 | | | | | 0.30 | | | | | 0.30 | | | | |
| Value of Benefit, $ | 0.0300 | | | | | 0.0330 | | | | | 0.0000 | | | | |
| Rate of Accrual of Value of Benefit, $/hour | 0.1000 | | | | | 0.1100 | | | | | 0.0000 | | | | |
| Mode in Second Segment | 1 | 2 | 4 | 5 | 8 | 1 | 2 | 4 | 5 | 8 | 1 | 2 | 4 | 5 | 8 |
| Length of Second Segment, hours | 0.75 | 0.50 | 0.60 | 0.70 | 0.50 | 0.60 | 0.50 | 0.60 | 0.70 | 0.50 | 0.40 | 0.50 | 0.60 | 0.70 | 0.50 |
| Value of Benefit, $ | 0.1725 | 0.1800 | 0.1500 | 0.2200 | 0.1500 | 0.0660 | 0.1500 | 0.1500 | 0.2200 | 0.1500 | 0.1940 | 0.2100 | 0.1500 | 0.2200 | 0.1500 |
| Rate of accrual of Value of benefit, $/hour | 0.2300 | 0.3600 | 0.2500 | 0.3143 | 0.3000 | 0.1100 | 0.3000 | 0.2500 | 0.3143 | 0.3000 | 0.4850 | 0.4200 | 0.2500 | 0.3143 | 0.3000 |
| Time Interval, hours | 1.050 | 0.800 | 0.900 | 1.000 | 0.800 | 0.900 | 0.800 | 0.900 | 1.000 | 0.800 | 0.700 | 0.800 | 0.900 | 1.000 | 0.800 |
| Accumulated Value of Benefit, $ | 0.2025 | 0.2100 | 0.1800 | 0.2500 | 0.1800 | 0.0990 | 0.1830 | 0.1830 | 0.2530 | 0.1830 | 0.1940 | 0.2100 | 0.1500 | 0.2200 | 0.1500 |
| Rate of Accrual of Accumulated Value of Benefit, $/hour | 0.1929 | 0.2625 | 0.2000 | 0.2500 | 0.2250 | 0.1100 | 0.2288 | 0.2033 | 0.2530 | 0.2288 | 0.2771 | 0.2625 | 0.1667 | 0.2200 | 0.1875 |

FIG. 13

CONTROL OF POWER GENERATION SYSTEM HAVING THERMAL ENERGY AND THERMODYNAMIC ENGINE COMPONENTS

BACKGROUND OF THE INVENTION

1. Field of the Invention

Aspects of the present invention generally relate to control systems for a power generation system having thermal energy and thermodynamic engine components.

2. Background of the Art

Environmental concerns and political and economic forces have renewed the interest in all facets of alternative energy. Many sources of alternative energy, particularly solar energy, still have tremendous potential for greater adoption. Despite the distinct advantages of emitting little or no pollution or greenhouse gasses, having an unlimited free energy supply, and being harnessed with many already proven technologies, solar energy requires further development of its technologies to make it a cost competitive energy source for heat and electricity for residences and commercial buildings compared with heat and electricity now produced by burning coal, natural gas, and oil.

Solar electric generating systems suitable for distributed electric power generation or installation on residential or commercial buildings typically use photovoltaic semiconductor technologies that convert sunlight directly into electricity. Although viable in some applications, existing photovoltaic solutions are too inefficient and cost prohibitive to be broadly adopted as an electric energy source or thermal energy source. Similarly scaled solar thermal systems are used for space and domestic hot water heating, but have no provision for electric power generation, and cannot reconcile the disparity between the high demands for thermal energy in cold months with the high availability of thermal energy in warm months. Because they are limited to producing only one form of energy, either electricity or heat but not both, neither solar energy platform can by itself practically address both electrical and thermal energy needs of residential or commercial buildings.

Recent advances in heat engine technology have rendered it feasible to incorporate a heat engine, such as a Stirling engine, into a solar thermal energy system and thereby use solar thermal energy to generate electricity in a distributed or in a combined distributed and grid-tied configuration. Heat energy delivered directly from a solar thermal energy collector or from solar thermal energy previously stored in a storage location is supplied to the heat engine, which in turn drives a generator to produce electricity. The heat engine may be used solely to generate the electricity for a structure, such as a residence, office or small industrial facility (collectively referred to as "building") at a given moment of time. However, as the electrical demand in the building will fluctuate over time, including during a day, during a week and over a yearly seasonal cycle, the heat engine may be unable to provide the entire electrical load at some times, or may be able to supply excess electricity at other times. For example, during cloudy conditions and storms, the solar irradiation on the collector is disrupted, requiring the use of a non-solar energy source, which may include grid-supplied electricity, to meet the electric power requirements of the building. Furthermore, it may also be desirable to use the solar thermal energy provided from a solar collector for space and water heating applications, thus creating a conflict between the need for electricity and the need for space and domestic hot water heating.

Where solar thermal energy is used solely for thermal heating, such as space and domestic hot water heating, the choice of how to use the thermal energy is rather straightforward: One or the other use is prioritized, and if inadequate thermal energy is available to meet both needs, then an additional energy source, such as natural gas provided by a utility, is used to provide the energy difference. However, where the solar thermal energy may be used to generate electricity (solely or in combination with heating demands), the optimal use of the energy is a function of a number of additional factors, including the immediate and future cost of electricity or other energy source, the time of day, the expected heating needs as compared to the electrical needs of the building and residents, the season of the year and any expected weather changes, such as approaching cold fronts, warm fronts or storms.

Thus, there is a need in the art for distributed energy distribution systems and combined distributed and grid-tied energy systems which enable the user to better optimize, or alternatively, enable intelligent selection of the use of the thermal energy supplied by a solar thermal collector or other local thermal energy source, and thereby increase the rate of return available from the investment in such a system.

SUMMARY OF THE INVENTION

There is provided a system for use in conjunction with a localized demand for electricity and a localized demand for heat, wherein a thermal energy source is selectively used to provide energy to one or more demands including a storage demand, an electricity demand met by generating electricity from the thermal energy source using a heat engine, a space heating demand, and a process heating demand such as domestic hot water heating, wherein the choice of which of the demands is met by utilizing energy from the heat source is based in part on current and/or contemplated conditions both internal to and external to the system.

In one aspect, the system is used in conjunction with an additional energy source, such as grid electricity, such that the decision of whether to use the heat source to generate heat-engine-derived electricity or use the heat source for another purpose may also include weighing the cost of grid electricity at a current and/or at a later time period.

In another aspect the system includes an energy storage, wherein a storage medium for the storage of heat may be heated to a temperature in the range of 200 to 300 degrees Celsius, and the stored energy may be used at another time to fulfill heating and/or electricity generation demands. Additionally, an electrical storage, such as a battery bank, may also be employed in the system, and charged by the electricity generated by the heat engine, such that the electricity may be recovered for local use during a period of higher grid electricity cost or when grid electricity is unavailable, such as from a storm-caused grid outage, or where grid connections are unavailable.

In another aspect, the system may be controlled to always prioritize the satisfaction of a specific demand when solar thermal energy is available. This may include selecting the specific demand based on time of day, the status of the heat storage, outside temperature, or other measurable or predictable values.

In another aspect, the system may be controlled to maximize an immediate benefit based upon the present conditions of the system. For example, where the benefit is selected to be grid electricity cost savings, the controller determines whether to draw grid electricity or to generate electricity, as well as whether to use the solar irradiation for storage or local heating needs.

In another aspect, the system may be controlled to maximize a benefit, such as electricity savings, calculated to accrue during future operation. For example, the controller may first calculate the benefit expected to accrue from hypothetical operation of the system in each of one or more unique sequences of one or more sequential configurations of the system, where each configuration is achieved by energizing the appropriate switches, relays, valves, and pumps to cause thermal and electrical energy to flow in paths unique to that configuration, and where calculation of the performance of the system in each configuration and the benefit produced thereby are based upon past, present, or forecast factors. The controller may then identify which of these sequences produces the maximum accrual of the benefit, and may then put the system into the configuration of operation that is first in this sequence. As a result, there may be a particular configuration in this sequence whose individual contribution to the accrued benefit may be less than the individual contribution produced by some other configuration that could have been chosen instead for this place in the sequence, but whose inclusion nonetheless produces, by the end of the sequence, a greater accrual of the benefit, from having favorably influenced the conditions encountered by subsequent configurations such that the sum of their individual contributions more than compensates for the choice of the particular configuration.

In another aspect, a Stirling engine that also has the capability to operate as a heat pump could enhance the functionality of some thermal energy power systems, particularly those installed in buildings having only electric service. An electric-powered heat pump drawing heat from solar heated heat transfer fluid that is warm, but not hot enough to heat the building, will operate at a much higher theoretical coefficient of performance than if drawing heat from the cold outside air or even the ground. Using the Stirling engine for this additional function thereby increases the utilization of the engine asset.

In another aspect, additional thermal energy storage tanks are included, which may be maintained at similar or different temperatures. For example, the system may include a first storage tank and a second storage tank. The first storage tank may be used to supply fluid for electric generation, and may be configured to store fluid at a hotter temperature than the second storage tank. The second storage tank, which may be dedicated to low temperature system components, such as space heating and domestic hot water systems, may be maintained at a lower temperature than the first tank. In such a two-storage-tank system, the first storage tank may be maintained at about 300° C. whereas the second tank may be maintained at about 100° C., in one possible example, although many other temperatures are possible.

As discussed above, the temperature difference across the Stirling engine causes the Stirling engine to operate and thereby drive an electric generator. Electricity from the generator, in turn, provides electricity for the building electric needs. The generator may directly produce the proper voltage and frequency used by the grid, which in the United States is 120 volts at 60 hertz, or may produce electricity in some other form which is then converted to the form used by the grid. The generator may thus be coupled to a building electric system (grid-tied or distributed), such as through a dedicated breaker on a conventional junction box.

Further, by way of a power conditioner, the Stirling engine power generation system may provide electricity to the grid (i.e., running the meter backwards). The controller may determine when such a scenario would be an efficient use of the power generation system. For example, if all heating and electrical needs of the building are being met or are not desired to be met, the system may run the Stirling engine to generate electricity for transmission over the grid. Thus, in one aspect, the system includes a switch under control of a controller whereby electricity generated from the Stirling engine is provided to the grid and not the building. In some situations, such as during a period of peak efficiency for the Stirling engine and a period of low heat and electricity demands, it may be more cost effective and/or efficient to buy electricity from a utility company and provide all electricity generated form the Stirling engine to the grid.

The system further includes the control of the system when integrated with external energy sources and information about them, including when such an energy source, such as the electric utility grid, may act as a sink and thereby receive energy produced by the system. The system controller, for example, may thus accept and act on information regarding the price of electric power sold to as well as purchased from an electric utility. Such system inputs may be used by the controller to optimize operation of the system to maximize electric energy production or the rate of return on investment, or to minimize the cost or amount of purchased electric or thermal energy, or the amount of greenhouse gas emissions, or in respect of some metric based on combinations thereof.

The factors or information to consider in determining an optimal operation of the system include past, present, and expected future values of at least ambient temperature, system temperatures, solar irradiance or other heat availability, building heat load, price information from the electric utility, time of day, and date.

These and other advantages and features of the present invention will become apparent to those of ordinary skill in the art upon reading this disclosure in its entirety.

BRIEF DESCRIPTION OF THE DRAWINGS

FIG. 13 is a decision tree showing the amount of a benefit produced by every combination of two, sequential configurations of operation, where the first configuration is chosen from among three possible, and the second configuration is chosen from among five possible, for the satisfaction of a heating demand in an example scenario.

DETAILED DESCRIPTION OF EMBODIMENTS

Aspects of the present invention involve a power generation system that integrates forms of alternative energy such as solar energy, geothermal energy, industrial or commercial waste heat; traditional or uninterruptible energy sources such as propane or fuel oil stored on site or as provided by connection to an electric power grid or a natural gas service; on-site energy stores; space heating and cooling demands; domestic hot water heating demands; thermodynamic engines that may generate electricity; and heat pumps. The integration involves the control of the system to account for factors external to the system, which may include past, historical, present, or forecast conditions of time of day, day of week, calendar day, weather, solar irradiance, and availability and price of energy for both sale to as well as purchase from a utility or other energy supplier, as well as factors internal to the system, which may include past, historical, present, or forecast conditions of temperature, pressure, flow rate, or power generated or consumed by the power generation system, as well as energy demands of a building such as a residence or some other energy user. Control includes determining when to drive a thermodynamic heat engine or heat pump, provide space, process or domestic hot water heating, store energy for later use in thermal or electrical storage forms, draw upon uninterruptible energy sources, or disburse energy generated within the system such that one or more benefits are achieved. Such benefits include maximizing electric energy production or the rate of return on investment, or minimizing the cost or amount of purchased electric or thermal energy, or the amount of greenhouse gas emissions generated. With the advancements set forth herein, the power generation system may thus more efficiently use forms of alternative energy such as solar energy, geothermal energy, or industrial waste heat, in ways that are more cost competitive with conventional forms of energy or which provide other desired benefits to the user.

Figure 1:
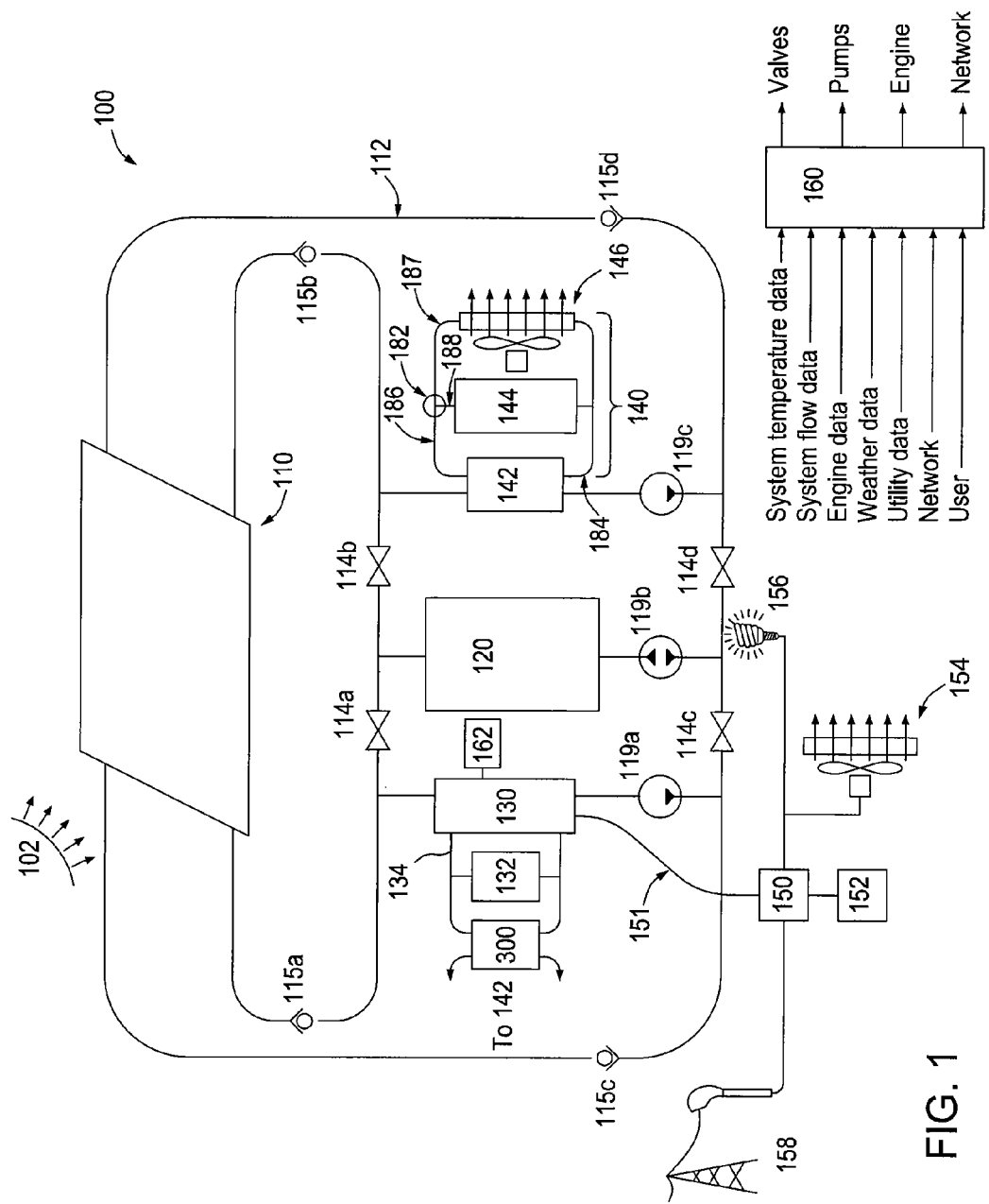
FIG. 1 is a schematic view of a system useful for the generation of electricity using solar thermal energy in a distributed situation.

FIG. 1 is a schematic diagram of a power generation system 100 comprising a heat source, in this specific embodiment a solar thermal energy collector 110 heated by solar irradiance 102 through which a fluid (typically an oil) is flowed to recover heat from solar irradiance and move that heat, as captured in such fluid, to one or more demands for such heat. These demands include a thermal storage 120, a heat engine such as Stirling engine 130, and a heating demand 140, including both a domestic hot water heating demand 144 and a space heating demand 146. Stirling engine 130 is operatively coupled to a generator (not shown) to generate electricity as is well known in the art. The electrical output of Stirling engine 130 is coupled, via an electrical cable 151, to a control switch 150, from which the electricity generated from Stirling engine 130 may be directed to one of several demands, in this case the immediate localized electricity needs 156 for lighting, appliances, etc., space heating demand 146 when provided by an electrically driven heat pump, space cooling or air conditioning demand 154, storage in a storage battery bank 152, or transmission to the grid 158. Switch 150 also may function to allow grid-based electricity to be used for these electrical loads, selectively or in aggregate. Additionally, Stirling engine 130 may be operated as a heat pump, to supply locally produced heat for use inside the building. A heat pump receives work, which may be electrical or mechanical, and heat at a lower temperature, and discharges both the work and heat inputs in the form of heat at a higher temperature. In this case, the supply of heat from the thermal storage 120 or solar thermal energy collector 110 is directed to the hot side of Stirling engine 130, and electricity is supplied to the electric generator operably connected to the thermodynamic engine component within Stirling engine 130 to cause the generator to operate as a motor to rotably drive the thermodynamic engine component within Stirling engine 130 in the same direction it operates as an engine, and heat is discharged from the cold side of Stirling engine 130 at a higher temperature than that of the supply of heat. The discharged heat is transferred into residential heating demand 140, including both hot water heating demand 144 and space heating demand 146, via heat exchanger 300, instead of into the environment via heat rejecter 132.

Referring still to FIG. 1, to provide energy from solar thermal energy collector 110 to heating demand 140, thermal storage 120, and Stirling engine 130, a fluid, such as an oil having high heat capacity and a boiling point exceeding the expected temperature and pressure conditions to which it will be exposed, is circulated through a series of conduits 112, valves 114, and check valves 115 to, from, and between heating demand 140, thermal storage 120, and Stirling engine 130. To enable the selective transmission of the oil to heating demand 140, thermal storage 120, and Stirling engine 130, valves 114a to 114d are selectively opened or closed and pumps 119a to 119c are selectively energized under the control of a system controller 160. Check valves 115a to 115d prevent backflow into solar thermal energy collector 110. In the system of FIG. 1, the valves are shut-off valves, wherein the valve can block the passage of fluid therethrough. In other configurations, the valves may be three way valves, which direct the fluid flow to one of two selectable outlets, or they may be proportional valves, which direct controllable portions of the fluid flow to each of their two outlets. Other fluid handling components may be incorporated, such as venting valves, expansion tanks, filters, and pressure relieve valves, that are required for safe and proper operation of any fluid system. To enable fluid flow, pumps 119a to 119c are provided, to maintain circulation of the fluid or oil as appropriate. The cold side of Stirling engine 130 is coupled to heat rejecter 132, which circulates a cooling fluid through the cold side of Stirling engine 130 to maintain an appropriate temperature difference between the hot and cold sides of Stirling engine 130. The temperature difference across a thermodynamic or heat engine, in this example a Stirling engine, may impact performance, where greater temperature differences favorably impact performance. Particular thermodynamic engine arrangements operate advantageously on heat delivered to the hot side at what is considered medium temperature, in the range of approximately 100° C. to 300° C. Heat provided to the hot side in this temperature range may advantageously be solar energy, geothermal energy, or industrial waste heat.

Thermal storage 120 is specifically configured to obtain or extract heat from the fluid flowing therethrough, and release that heat as needed at a later time. Realization of thermal storage 120 may be in the form of the fluid itself, a fluid storage in which a heat exchanger exchanges heat between the oil and a different fluid within thermal storage 120, a solid thermal mass, such as rock, which is heated by the oil, or may include a phase change material. In each instance, heat from the oil circulating through solar thermal energy collector 110 is captured in thermal storage 120 for later release. Thermal storage 120 is preferably located below ground and surrounded by insulation to maximize the heat retaining capability thereof. Thermal storage 120 may be a single storage, or may be segmented into two or more distinct storages, such that different parts of the storage may be maintained or optimized to different temperatures, for example a high temperature storage for Stirling engine 130 and a lower temperature storage for heating demand 140.

Figure 2:
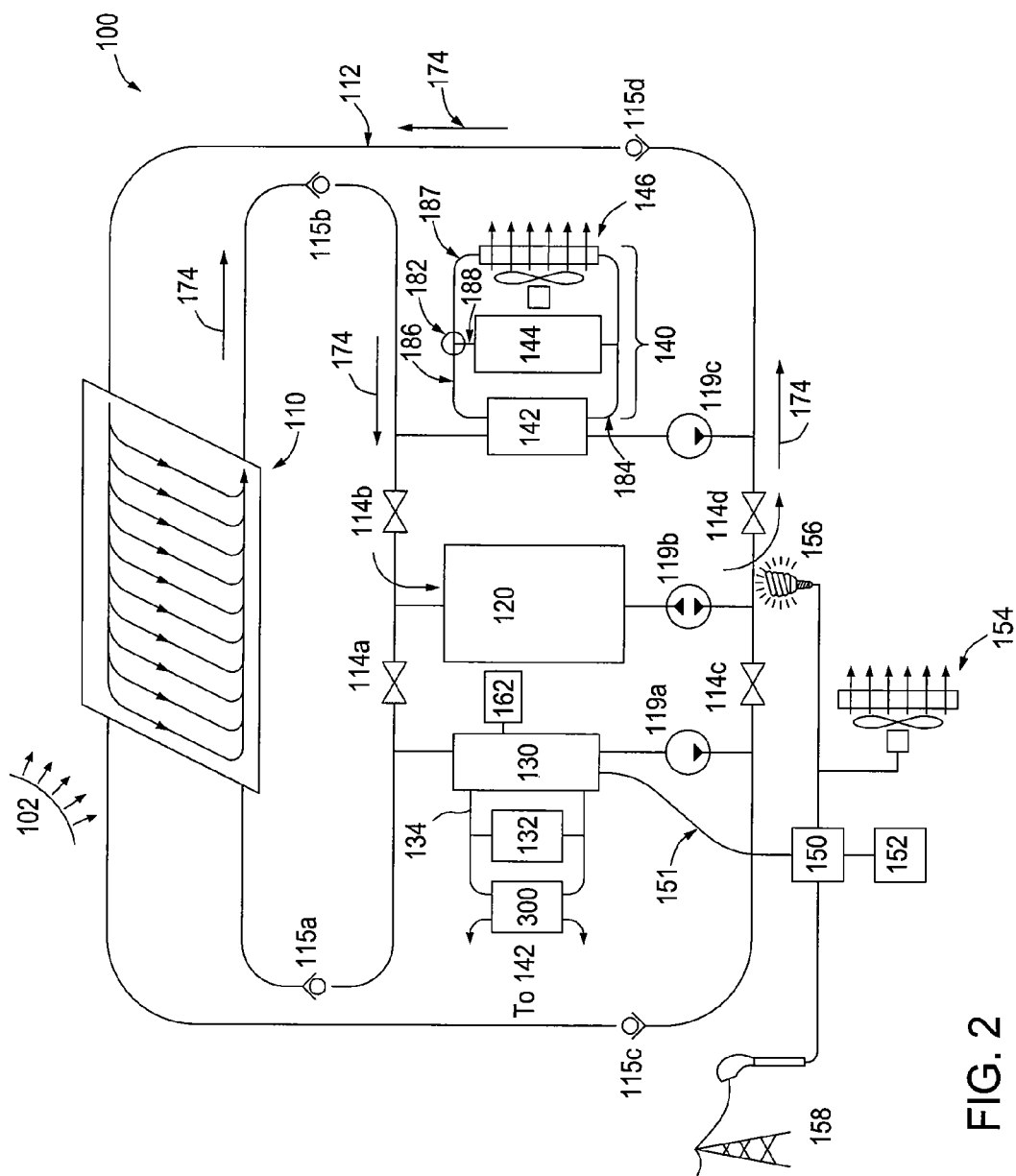
FIG. 2 is a schematic view of a system useful for the generation of electricity using solar thermal energy in a distributed situation, showing the flow of fluid therethrough to supply heat to a thermal storage.

Referring now to FIG. 2, the flow of fluid in the system of FIG. 1 needed to supply heat from solar thermal energy collector 110 to thermal storage 120 is shown by arrows 174. In this configuration, valves 114a and 114c are closed, valves 114b and 114d are open, and pump 119b is energized to draw fluid out of the bottom of thermal storage 120. The fluid flows from solar thermal energy collector 110, through check valve 115b, valve 114b, and into thermal storage 120. After flowing through thermal storage 120 and heating a thermal mass held therein, the fluid then flows through pump 119b, check valve 115d, and thence back to solar thermal energy collector 110.

Figure 3:
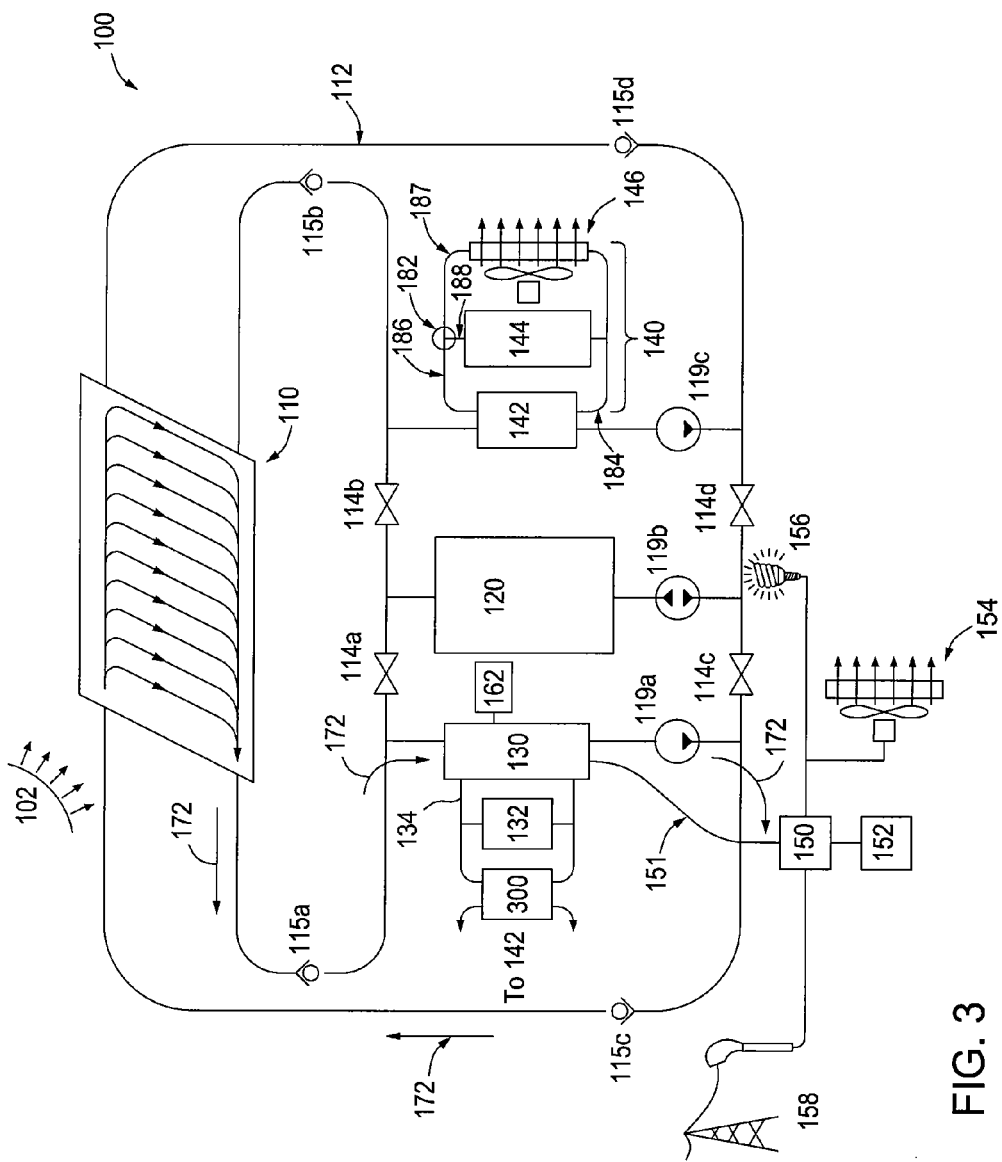
FIG. 3 is a schematic view of a system useful for the generation of electricity using solar thermal energy in a distributed situation, showing the flow of fluid therethrough to supply heat to a heat engine.

Referring now to FIG. 3, the flow of fluid in FIG. 1 to supply heat from solar thermal energy collector 110 to Stirling engine 130 is shown by arrows 172. In this configuration, valves 114a, 114b, 114c, and 114d are closed, and pump 119a is energized. The fluid flows from solar thermal energy collector 110, through check valve 115a, and into the hot side of Stirling engine 130. After heat exchange with the Stirling engine 130 hot side to heat the working fluid of Stirling engine 130, the fluid (oil) then flows through pump 119a, check valve 115c, and thence back to solar thermal energy collector 110.

Figure 4:
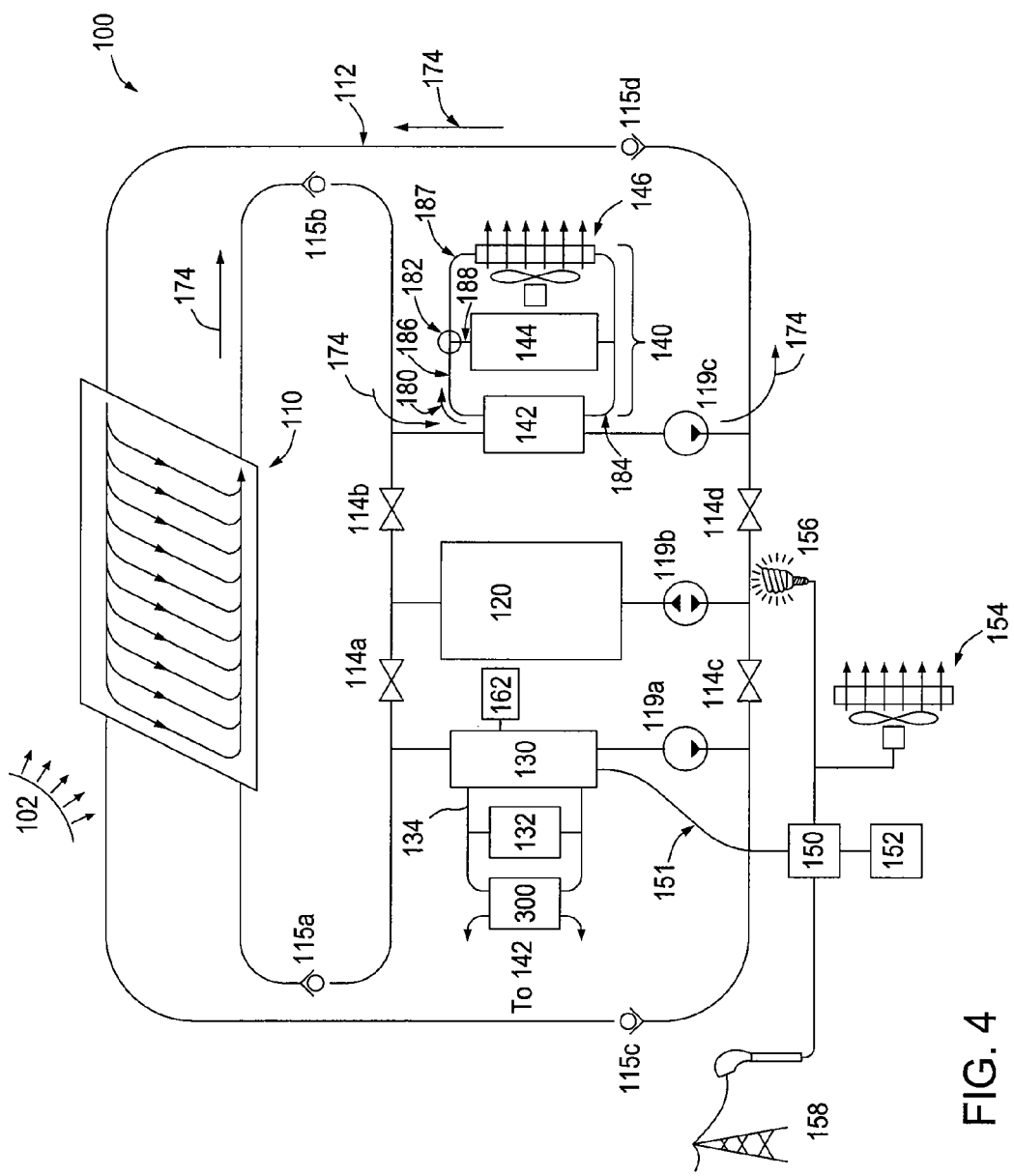
FIG. 4 is a schematic view of a system useful for the generation of electricity using solar thermal energy in a distributed situation, showing the flow of fluid therethrough to supply heat to a heating demand.

Referring now to FIG. 4, the flow of fluid in FIG. 1 to supply heat from solar thermal energy collector 110 to heating demand 140 is shown by arrows 174. In this configuration, valves 114a, 114b, 114c, and 114d are closed, and pump 119c is energized. The fluid flows from solar thermal energy collector 110, through check valve 115b, and into heat exchanger 142. After heat exchange with heat exchanger 142, the fluid then flows through pump 119c, check valve 115d, and thence back to solar thermal energy collector 110. Heat exchanger 142 exchanges heat between the fluid (oil) circulating through conduits 112 and water circulating through feed lines 186 in the direction of arrows 180 to provide the heated water to hot water heating demand 144 or space heating demand 146. Water valve 182 is provided to selectively route the heated water to space heating demand 146 though flow line 187, or to hot water heating demand 144 through flow line 188. After passing through heating demands 144 or 146, the water returns via water return 184 to heat exchanger 142. It may be possible to operate a single device as either a heating demand or a cooling demand, and to switch between the two, as directed by a controller Thus, for example, a bank of radiator coils may be operated with hot water to provide space heating in winter, and operated with cold water to provide space cooling in summer.

Figure 5:
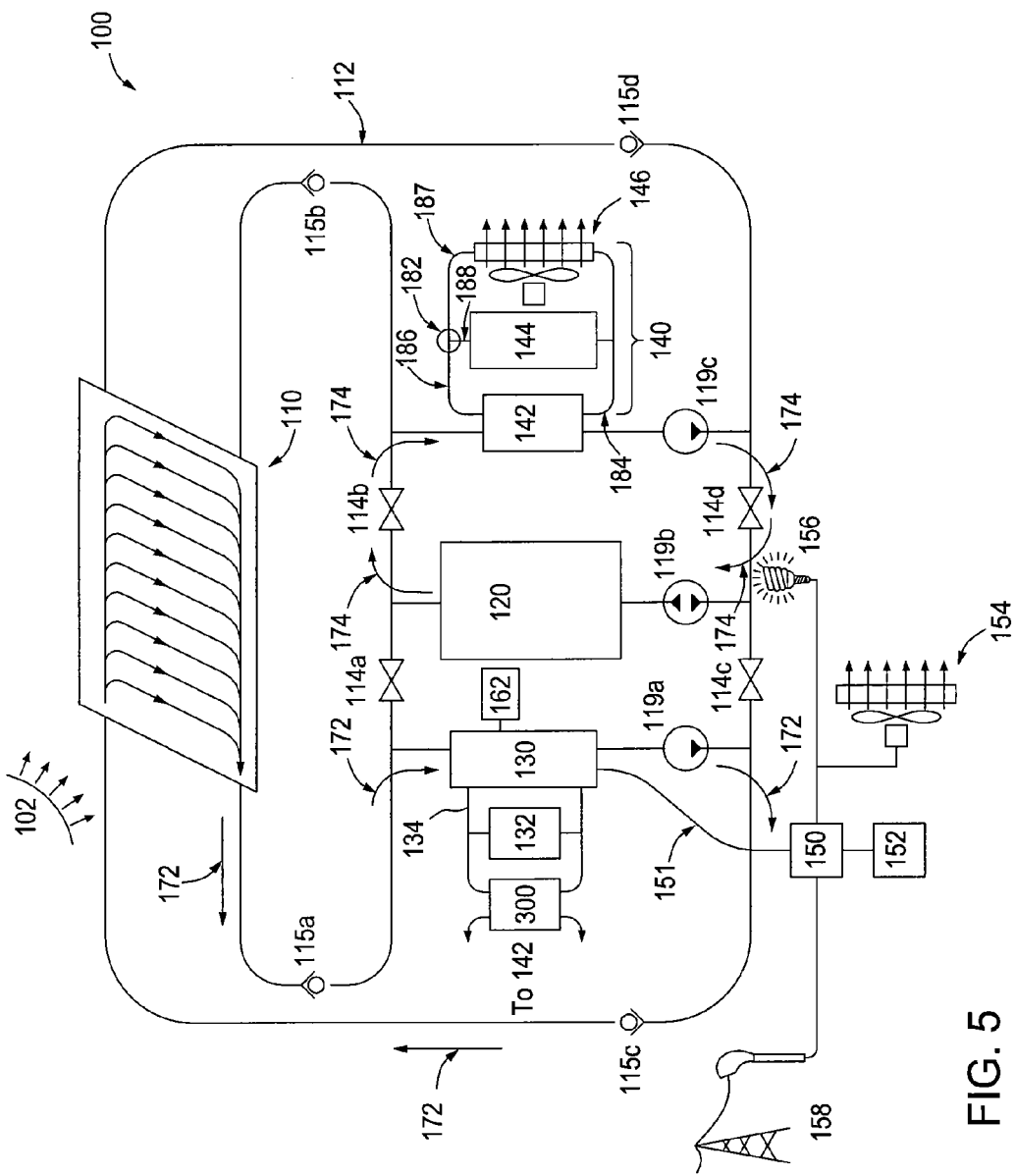
FIG. 5 is a schematic view of a system useful for the generation of electricity using solar thermal energy in a distributed situation, showing the flow of fluid therethrough to supply heat to a heat engine and a heating demand.

Referring now to FIG. 5, a flow of fluid in FIG. 1 to supply heat from solar thermal energy collector 110 to Stirling engine 130 is shown by arrows 172, and a separate flow of fluid to supply heat from thermal storage 120 to heating demand 140 is shown by arrows 174. In this configuration, valves 114a and 114c are closed, valves 114b and 114d are open, pumps 119a and 119c are energized, and pump 119b is energized to pump fluid into the bottom of thermal storage 120. The fluid flowing over the path indicated by arrows 172 flows from solar thermal energy collector 110, through check valve 115a, and into the hot side of Stirling engine 130. After heat exchange with the Stirling engine 130 hot side to heat the working fluid of Stirling engine 130, the fluid (oil) then flows through pump 119a, check valve 115c, and thence back to solar thermal energy collector 110. The fluid flowing over the path indicated by arrows 174 flows from thermal storage 120, through valve 114b, and into heat exchanger 142. After heat exchange with heat exchanger 142, the fluid then flows through pump 119c, valve 114d, pump 119b, and thence back to thermal storage 120. Heat exchange with heating demands 144 and 146 is as described in paragraph [0040].

Figure 6:
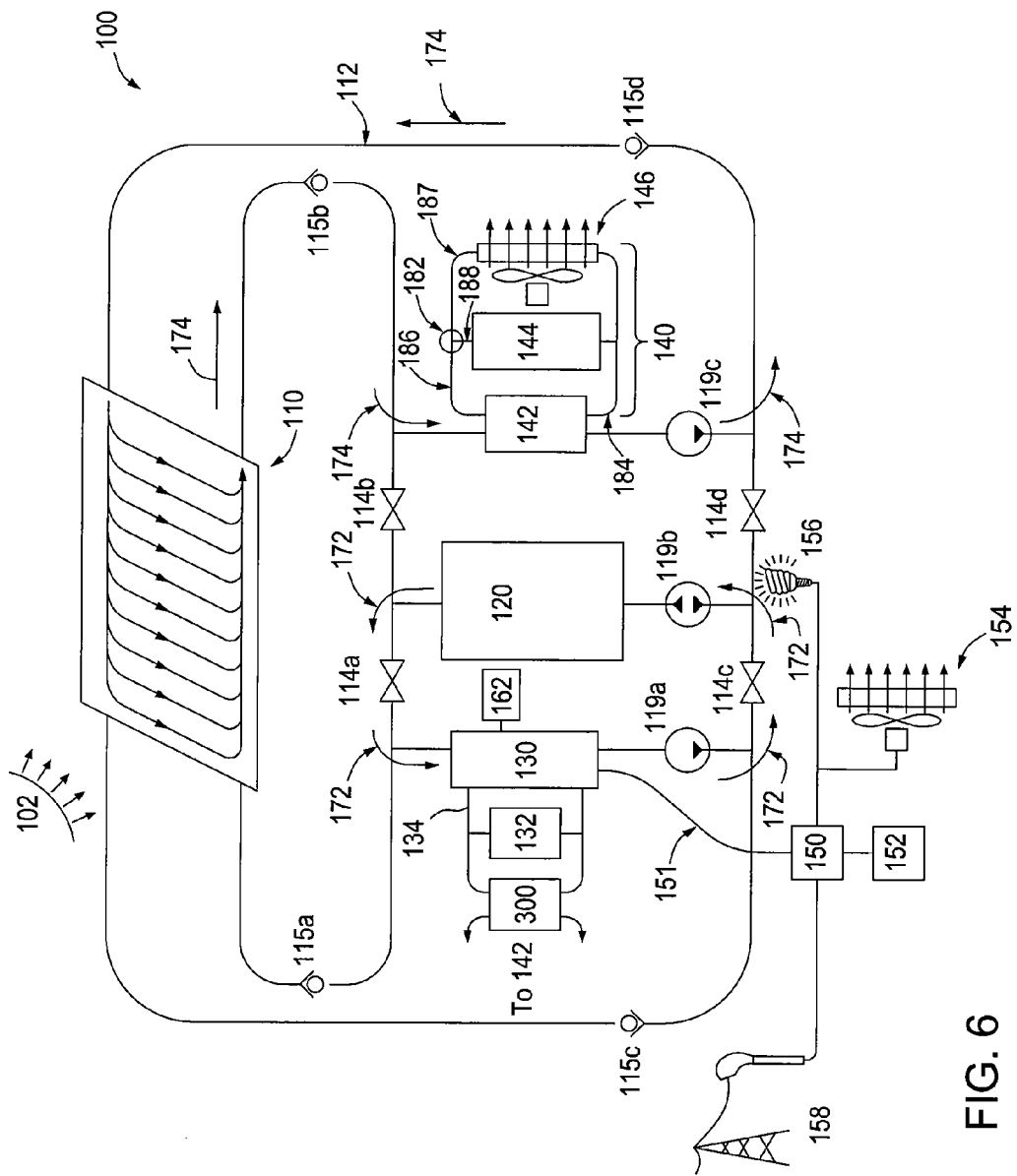
FIG. 6 is a schematic view of a system useful for the generation of electricity using solar thermal energy in a distributed situation, showing the flow of fluid therethrough to supply heat to a heating demand while simultaneously supplying heat from a thermal storage to a heat engine.

Referring now to FIG. 6, a flow of fluid in FIG. 1 to supply heat from thermal storage 120 to Stirling engine 130 is shown by arrows 172, and a separate flow of fluid to supply heat from solar thermal energy collector 110 to heating demand 140 is shown by arrows 174. In this configuration, valves 114a and 114c are open, valves 114b and 114d are closed, pumps 119a and 119c are energized, and pump 119b is energized to pump fluid into the bottom of thermal storage 120. The fluid flowing over the path indicated by arrows 172 flows from thermal storage 120, through valve 114a, and into the hot side of Stirling engine 130. After heat exchange with the Stirling engine 130 hot side to heat the working fluid of Stirling engine 130, the fluid (oil) then flows through pump 119a, valve 114c, and thence back to thermal storage 120. The fluid flowing over the path indicated by arrows 174 flows from solar thermal energy collector 110, through check valve 115b, and into heat exchanger 142. After heat exchange with heat exchanger 142, the fluid then flows through pump 119c, check valve 115d, and thence back to solar thermal energy collector 110. Heat exchange with heating demands 144 and 146 is as described in paragraph [0040].

Figure 7:
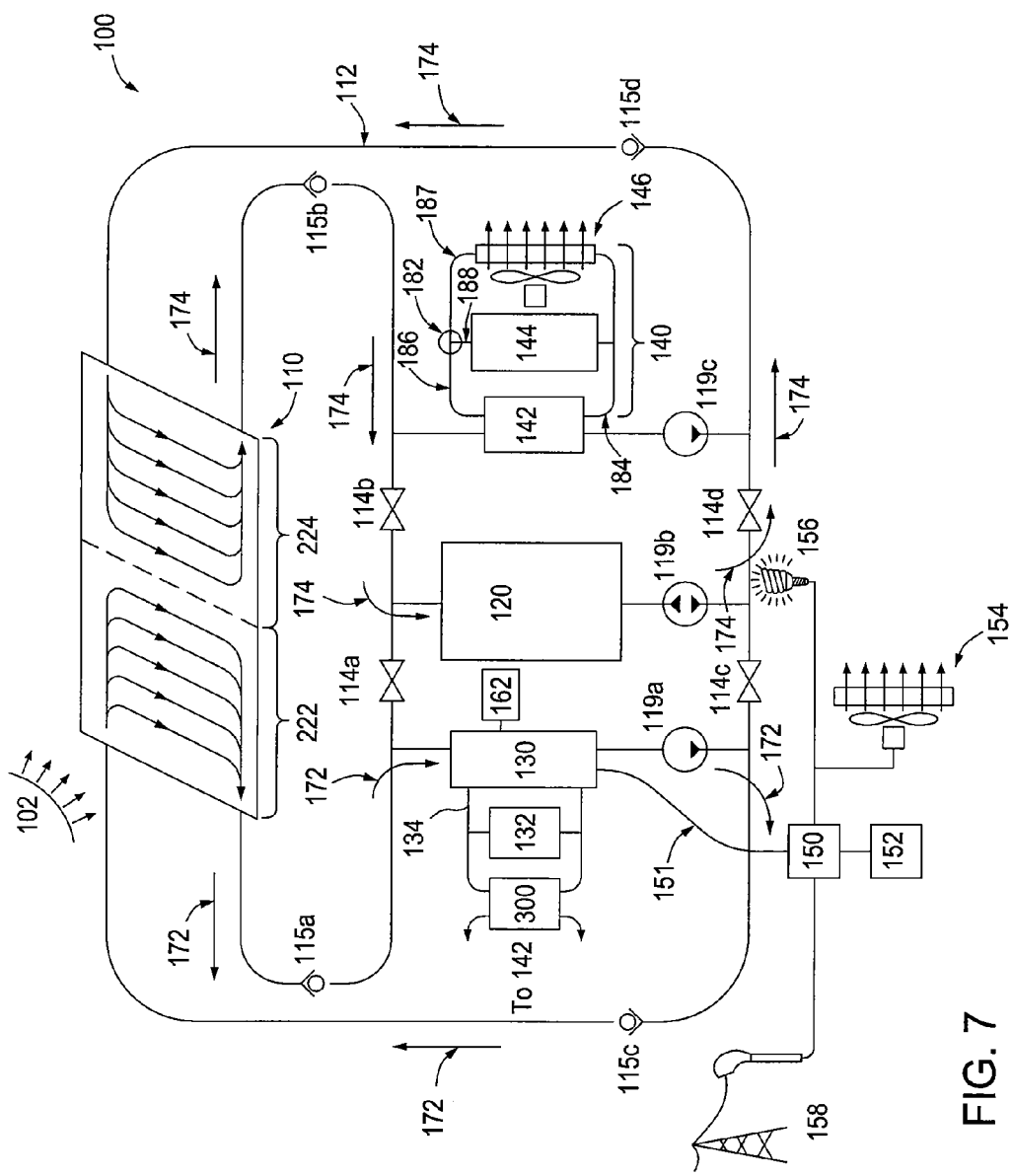
FIG. 7 is a schematic view of a system useful for the generation of electricity using solar thermal energy in a distributed situation, showing the flow of fluid therethrough to supply heat to a heat engine and a thermal storage, the heat being supplied from different portions of a solar collector.

Referring now to FIG. 7, an additional embodiment of system 100 is shown, wherein solar thermal energy collector 110 of FIG. 1 further includes more than one fluidly isolatable portion, in this case first portion 222 and second portion 224. A flow of fluid to supply heat from portion 222 of solar thermal energy collector 110 to Stirling engine 130 is shown by arrows 172, and a separate flow of fluid to supply heat from portion 224 of solar thermal energy collector 110 to thermal storage 120 is shown by arrows 174. In this configuration, valves 114a and 114c are closed, valves 114b and 114d are open, pump 119a is energized, and pump 119b is energized to draw fluid out of the bottom of thermal storage 120. The fluid flowing over the path indicated by arrows 172 flows from portion 222 of solar thermal energy collector 110, through check valve 115a, and into the hot side of Stirling engine 130. After heat exchange with the Stirling engine 130 hot side to heat the working fluid of Stirling engine 130, the fluid (oil) then flows through pump 119a, check valve 115c, and thence back to portion 222 of solar thermal energy collector 110. The fluid flowing over the path indicated by arrows 174 flows from portion 224 of solar thermal energy collector 110, through check valve 115b, valve 114b, and into thermal storage 120. After flowing through thermal storage 120 and heating a thermal mass held therein, the fluid then flows through pump 119b, valve 114d, check valve 115d, and thence back to portion 224 of solar thermal energy collector 110.

Figure 8:
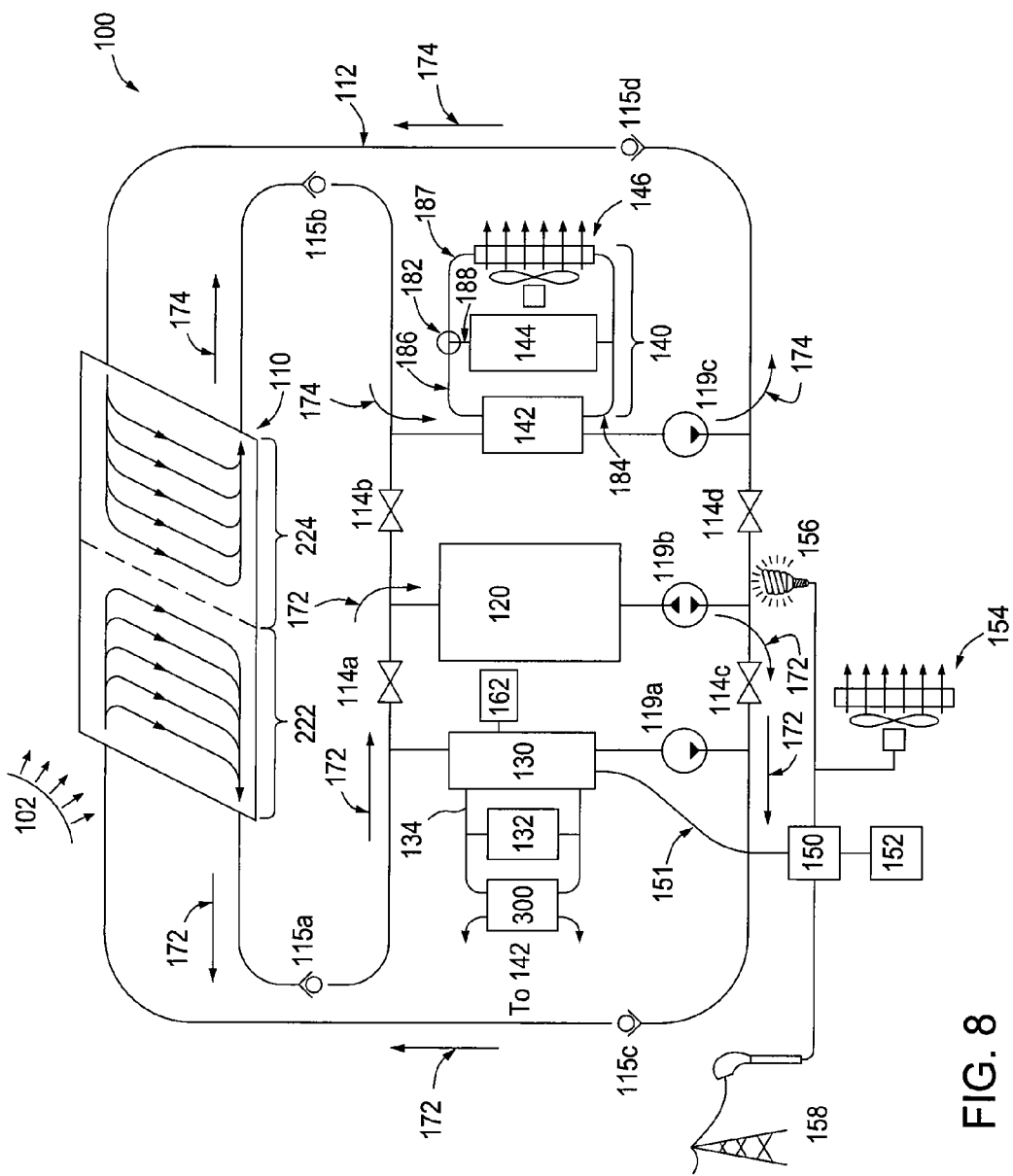
FIG. 8 is a schematic view of a system useful for the generation of electricity using solar thermal energy in a distributed situation, showing the flow of fluid therethrough to supply heat to a heat demand and a thermal storage, the heat being supplied from different portions of a solar collector.

Referring now to FIG. 8, a flow of fluid in FIG. 7 to supply heat from portion 222 of solar thermal energy collector 110 to thermal storage 120 is shown by arrows 172, and a separate flow of fluid to supply heat from portion 224 of solar thermal energy collector 110 to heating demand 140 is shown by arrows 174. In this configuration, valves 114a and 114c are open, valves 114c and 114d are closed, pumps 119a and 119c are energized, and pump 119b is energized to draw fluid out of the bottom of thermal storage 120. The fluid flowing over the path indicated by arrows 172 flows from portion 222 of solar thermal energy collector 110, through check valve 115a, and into the hot side of Stirling engine 130. After heat exchange with the Stirling engine 130 hot side to heat the working fluid of Stirling engine 130, the fluid (oil) then flows through pump 119a, check valve 115c, and thence back to portion 222 of solar thermal energy collector 110. The fluid flowing over the path indicated by arrows 174 flows from portion 224 of solar thermal energy collector 110, through check valve 115b, and into heat exchanger 142. After heat exchange with heat exchanger 142, the fluid then flows through pump 119c, check valve 115d, and thence back to portion 224 of solar thermal energy collector 110. Heat exchange with heating demands 144 and 146 is as described in paragraph [0040].

Figure 9:
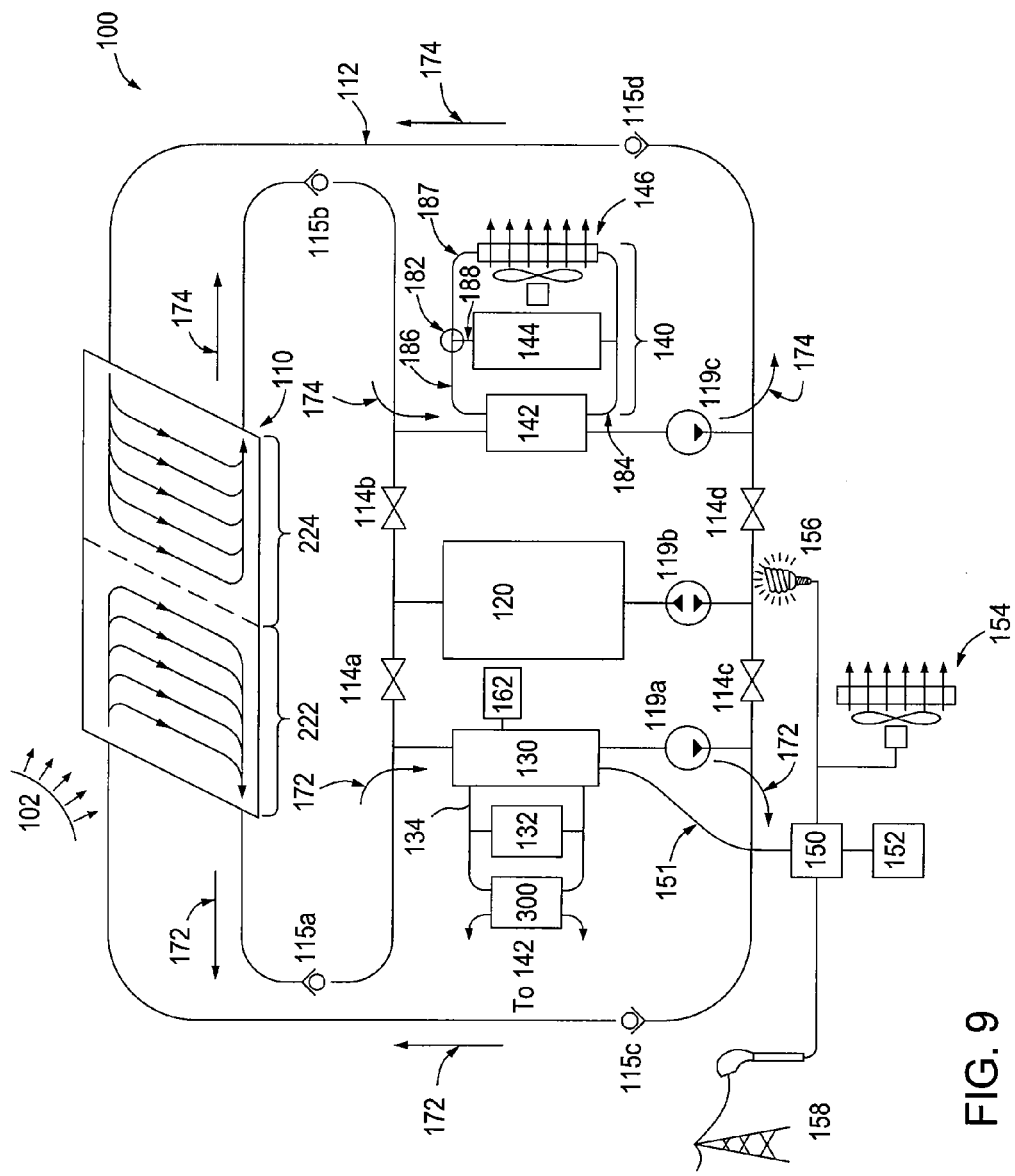
FIG. 9 is a schematic view of a system useful for the generation of electricity using solar thermal energy in a distributed situation, showing the flow of fluid therethrough to supply heat to a heat engine and a heating demand, the heat being supplied from different portions of a solar collector.

Referring now to FIG. 9, a flow of fluid in FIG. 7 to supply heat from portion 222 of solar thermal energy collector 110 to Stirling engine 130 is shown by arrows 172, and a separate flow of fluid to supply heat from portion 224 of solar thermal energy collector 110 to heating demand 140 is shown by arrows 174. In this configuration, valves 114a, 114b, 114c, and 114d are closed, and pumps 119a and 119c are energized. The fluid flowing over the path indicated by arrows 172 flows from portion 222 of solar thermal energy collector 110, through check valve 115a, and into the hot side of Stirling engine 130. After heat exchange with the Stirling engine 130 hot side to heat the working fluid of Stirling engine 130, the fluid (oil) then flows through pump 119a, check valve 115c, and thence back to portion 222 of solar thermal energy collector 110. The fluid flowing over the path indicated by arrows 174 flows from portion 224 of solar thermal energy collector 110, through check valve 115b, and into heat exchanger 142. After heat exchange with heat exchanger 142, the fluid then flows through pump 119c, check valve 115d, and thence back to portion 224 of solar thermal energy collector 110. Heat exchange with heating demands 144 and 146 is as described in paragraph [0040].

Figure 10:
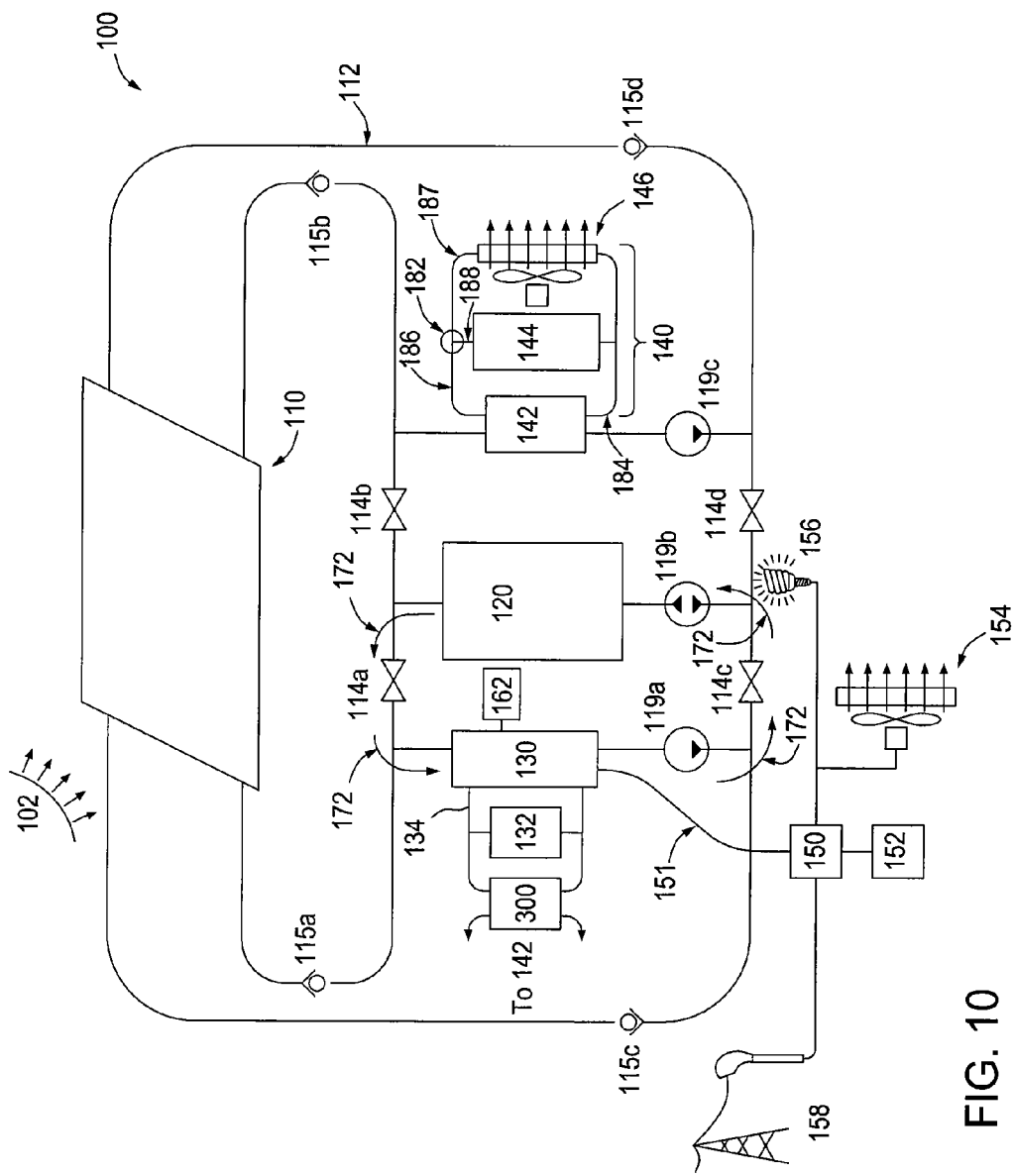
FIG. 10 is a schematic view of a system useful for the generation of electricity using solar thermal energy in a distributed situation, showing the flow of a fluid to supply heat from a thermal storage to a heat engine.

Referring now to FIG. 10, a flow of fluid in FIG. 1 to supply heat from thermal storage 120 to Stirling engine 130 is shown by arrows 172. In this configuration, valves 114a and 114c are open, valves 114b and 114d are closed, pump 119a is energized, and pump 119b is energized to pump fluid into the bottom of thermal storage 120. The fluid flows from thermal storage 120, through valve 114a, and into the hot side of Stirling engine 130. After heat exchange with the Stirling engine 130 hot side to heat the working fluid of Stirling engine 130, the fluid (oil) then flows through pump 119a, valve 114c, and thence back to thermal storage 120.

Figure 11:
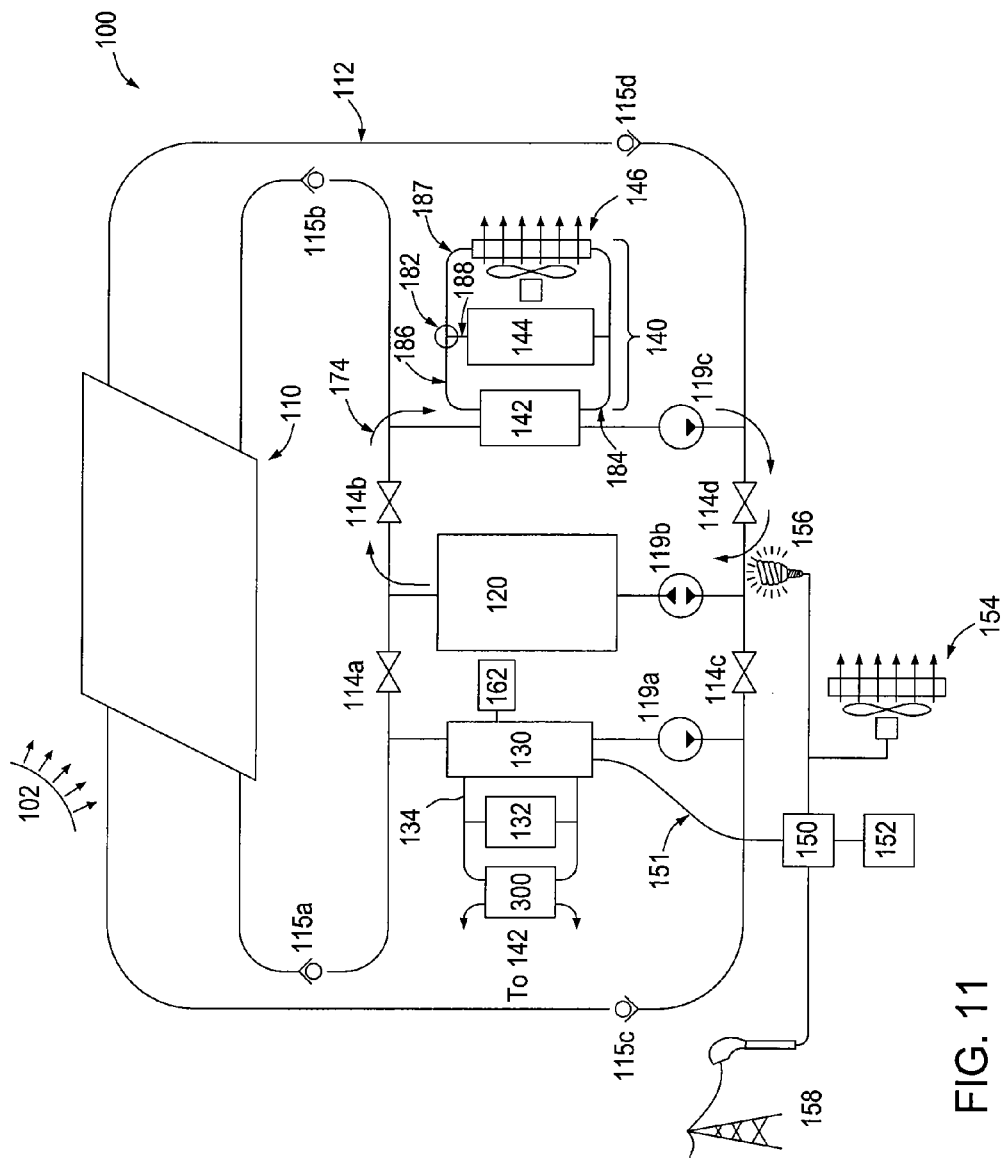
FIG. 11 is a schematic view of a system useful for the generation of electricity using solar thermal energy in a distributed situation, showing the flow of a fluid to supply heat from a thermal storage to a heating demand.

Referring now to FIG. 11, a flow of fluid in FIG. 1 to supply heat from thermal storage 120 to heating demand 140 is shown by arrows 174. In this configuration, valves 114a and 114c are closed, valves 114b and 114d are open, pump 119c is energized, and pump 119b is energized to pump fluid into the bottom of thermal storage 120. The fluid flows from thermal storage 120, through valve 114b, and into heat exchanger 142. After heat exchange with heat exchanger 142, the fluid then flows through pump 119c, valve 114d, pump 119b, and thence back to thermal storage 120. Heat exchange with heating demands 144 and 146 is as described in paragraph [0040].

Figure 12:
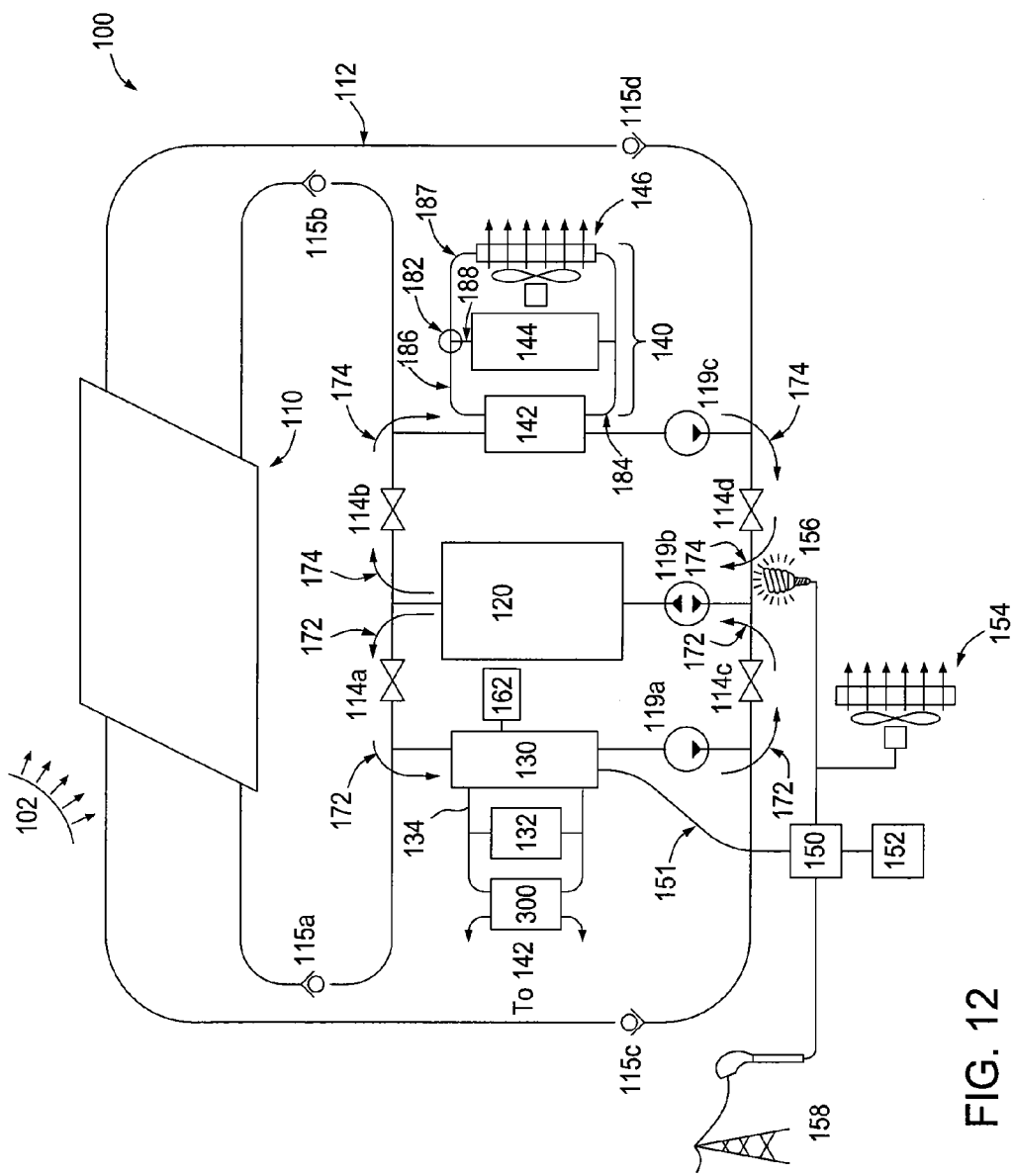
FIG. 12 is a schematic view of a system useful for the generation of electricity using solar thermal energy in a distributed situation, showing the flow of a fluid to supply heat from a thermal storage to a heat engine and a heating demand.

Referring now to FIG. 12, a flow of fluid in FIG. 1 to supply heat from thermal storage 120 to Stirling engine 130 is shown by arrows 172, and a separate flow of fluid to supply heat from thermal storage 120 to heating demand 140 is shown by arrows 174. In this configuration, valves 114a, 114b, 114c, and 114d are open, pumps 119a and 119c are energized, and pump 119b is energized to pump fluid into the bottom of thermal storage 120. The fluid flowing over the path indicated by arrows 172 flows from thermal storage 120, through valve 114a, and into the hot side of Stirling engine 130. After heat exchange with the Stirling engine 130 hot side to heat the working fluid of Stirling engine 130, the fluid (oil) then flows through pump 119a, valve 114c, and thence back to thermal storage 120. The fluid flowing over the path indicated by arrows 174 flows from thermal storage 120, through valve 114b, and into heat exchanger 142. After heat exchange with heat exchanger 142, the fluid then flows through pump 119c, valve 114d, pump 119b, and thence back to thermal storage 120. Heat exchange with heating demands 144 and 146 is as described in paragraph [0040].

To control the choice of how to use the solar irradiance among the solar thermal energy collector 110, thermal storage 120, Stirling engine 130, and heating demand 140, system controller 160 is provided. System controller 160 is connected via typical power and signal cabling (not shown) to each valve 114 to control the valve position, to each pump 119, to solar thermal energy collector 110, to thermal storage 120, to heating demand 140, to sensors for obtaining readings to assess the temperature of the fluid therein, to Stirling engine 130 to control the output thereof, to switch 150 to control the distribution of electricity, and to remaining sensor components useful to operate system 100. System controller 160 is configured to operate in at least one of two modes: A passive mode, in which the selection of the uses of the solar irradiance is chosen based upon present factors, including time of day, day of week, season, temperature of the system components, including that of heating demand 140, solar thermal energy collector 110, Stirling engine 130, and thermal storage 120, the current solar irradiance, predicted cost of electricity, etc., and past historical data, including prior usage habits; and a predicative mode, which uses additional information, including forward-looking data such as predicted rainfall or snowfall, predicted cloudiness, predicted temperatures, etc., to choose which demands are met with the solar irradiance at specific periods of time. In the passive mode of operation, the past habits of the residents of the building in which Stirling engine 130 is used are used to choose the "best" use of the heat supply. For example, during periods of high electrical demand the cost of grid electricity may be higher than that during periods of lower demand. During such periods, if there is no heating demand, it may be wise to generate electricity for sale to the grid 158, as opposed to any other choice, including storing heat in thermal storage 120. In the predictive mode of operation, if the same conditions are occurring, but the approach of a cold front in 30 minutes is anticipated, the best use may be to top off thermal storage 120, so that electricity may be generated later when the solar irradiance is interrupted by clouds.

A description of various possible configurations of the system components and other information relevant to the present application is set forth in U.S. application Ser. No. 11/734,854 now U.S. Pat. No. 7,877,999 titled "Power Generation and Space Conditioning Using a Thermodynamic Engine Driven Through Environmental Heating and Cooling," filed on Apr. 13, 2007, which is hereby incorporated by reference herein.

System 100 may operate in a number of configurations, hereinafter called modes, whereby the energy produced or collected by the energy source, in this example, solar energy collected by solar thermal energy collector 110, is allocated in a unique way for each mode. Each mode corresponds to a different way that the energy produced or collected is routed. The routing is physically achieved by conveying heat, energy, and the energy-bearing materials over certain of the conduits 112 to certain of the Stirling engine 130, heating demand 140, or thermal storage 120 by energizing the appropriate pumps 119 and by opening or closing the appropriate valves 114.

What modes are desirable or even possible must be determined from the purpose of a power generation system, as well as the type and number of heat sources, heating demands, and storage. A mode may be eliminated from consideration if it is learned that it is equivalent or inferior to another mode, or it is learned that it is never exercised in a particular system. Components associated with only this mode may also be eliminated from the system. For example, a system capable of providing space cooling in a warm climate but installed in a cool climate where space cooling is not needed would not be operated in any mode that involves space cooling, and hence would not need those components associated with only space cooling. Because of the tremendous number of different thermal power systems that can be imagined, it is therefore not the objective of this invention to identify all such thermal power systems and all modes possible with every combination of heat and other energy sources and other components that could conceivably be connected together as a system, but rather to achieve the most benefit from those modes that are available in any particular system, by optimally selecting or sequencing these modes using an intelligent control algorithm to direct the actions of the system's controller. It will therefore be readily seen by those of ordinary skill in the art that the teaching of this invention may be extended and applied to a greater or lesser number of similar heat and other energy sources and a greater or lesser number of other similar components connected together to operate as a thermal power system.

For the specific system 100 shown in FIG. 1, which is considered only representative and not unique or exhaustive of all possible thermal power systems and which is presented only by way of example, it is assumed that there is only one type of heat source (other than fossil sources such as gas or grid electricity), in this example in the form of solar energy collected by solar thermal energy collector 110 that may be divided into thermally independent sections that act as separate heat sources (as shown in FIG. 7), one thermal storage 120, one heat exchanger 142, one heating demand 140 consisting of space heating demand 146 and domestic hot water heating demand 144, one thermodynamic engine, in this case, Stirling engine 130, one heat rejection pathway 134, one heat rejecter 132, and one system controller 160. In this example, a high-temperature, oil-based heat transfer fluid, which may reach temperatures as high as 300 degrees C., is the energy-bearing material routed by pathways 112 and is stored in bulk in a tank that together comprise thermal storage 120. Water is the energy-bearing material routed through the heating demand 140, necessitating the use of heat exchanger 142 to convey heat into the water without boiling it. The energy-bearing material routed through heat rejection pathway 134 is a water-glycol antifreeze mixture. The heat rejecter 132 is used to reject heat from only the running Stirling engine 130 and for no other purpose, and hence is assumed to be active in any mode wherein Stirling engine 130 is running.

So that the number of modes considered in the examples of different control strategies described further herein may be kept small for clarity, whether energy is being drawn from an uninterruptible energy source, such as the grid 158, is not used in this example to distinguish any mode. Energy is drawn from the uninterruptible energy source only to the extent that heating demand 140 is not satisfied by the heat provided by solar thermal energy collector 110 or by thermal storage 120, or electricity cannot be generated from Stirling engine 130 or recovered from electrical storage 152, regardless of what mode system 100 is in, and without prompting or intervention by system controller 160. Once system controller 160 puts system 100 in a particular configuration, system controller 160 cannot further decide whether system 100 should draw energy from the uninterruptible energy source. If system controller 160 had this responsibility, an additional mode of operation would have to be defined for every configuration that has the option of drawing energy from the uninterruptible energy source to supply heating demand 140. For the example system 100, this would increase the number of modes by 7, as there are 7 modes that involve supplying heat to heating demand 140, as is discussed hereinafter. In an actual installation, however, it is likely desirable to include these additional modes, to allow system controller 160 the option of directing system 100 to satisfy heating demand 140 by drawing energy from the uninterruptible energy source, even though there is sufficient energy available within the system to satisfy heating demand 140, if doing so produces a greater expected benefit, as may be calculated by system controller 160 when considering forecast factors.

The following modes may be identified, which are assumed as having already been determined to be possible, useful, and beneficial, but which are not assumed to be exhaustive of all possible modes this system 100 or any other may be put into. The modes are numbered, for later reference and convenience.

a. Mode 1: Solar thermal energy collector 110 provides heat to Stirling engine 130 and thermal storage 120 provides heat to heating demand 140. (FIG. 5)

b. Mode 2: Solar thermal energy collector 110 provides heat to heating demand 140 and thermal storage 120 provides heat to Stirling engine 130. (FIG. 6)

c. Mode 3: A first part 222 of solar thermal energy collector 110 provides heat to Stirling engine 130 and a second part 224 of solar thermal energy collector 110 provides heat to thermal storage 120. (FIG. 7)

d. Mode 4: A first part 222 of solar thermal energy collector 110 provides heat to energy storage 120 and a second part 224 of solar thermal energy collector 110 provides heat to heating demand 140. (FIG. 8)

e. Mode 5: A first part 222 of solar thermal energy collector 110 provides heat to Stirling engine 130 and a second part 224 of solar thermal energy collector 110 provides heat to heating demand 140. (FIG. 9)

f. Mode 6: Solar thermal energy collector 110 provides heat to Stirling engine 130. (FIG. 3)

g. Mode 7: Solar thermal energy collector 110 provides heat to thermal storage 120. (FIG. 2)
h. Mode 8: Solar thermal energy collector 110 provides heat to heating demand 140. (FIG. 4)
i. Mode 9: Thermal storage 120 provides heat to Stirling engine 130. (FIG. 10)
j. Mode 10: Thermal storage 120 provides heat to heating demand 140. (FIG. 11)
k. Mode 11: Thermal storage 120 provides heat to heating demand 140 and to Stirling engine 130. (FIG. 12)
l. Mode 12: The system is idle.

FIGS. 2 through 12 show system 100 with the heat transfer fluid routing of each mode (except mode 12) superposed on the system diagram with arrows.

Like the operation of heat rejection pathway 134 and use of the uninterruptible energy source such as the grid 158 described above, certain other operative characteristics of system 100 need not be made explicit in the description of the modes 1 through 12 above, such as safety actions that would apply regardless of what mode system 100 is in, and details of a separate engine controller 162 (FIG. 1), which include starting, stopping, regulating speed, and reporting status to system controller 160. Another such characteristic may be determining what portion of solar thermal energy collector 110 is to be allocated to Stirling engine 130, heating demand 140, and thermal storage 120 when any two are simultaneously receiving heat from solar thermal energy collector 110. Another such characteristic may be optimally managing the engine load such that, when Stirling engine 130 is receiving heat form solar thermal energy collector 110, the combined efficiency of solar thermal energy collector 110 and Stirling engine 130 operating in combination is maximized, by using, for example, maximum power point tracking control, or by looking up the optimum engine load in an engine performance map, either of which method may be built into engine controller 162 and not necessarily into system controller 160. When Stirling engine 130 is producing less than maximum power or is operating highly efficiently, the rates of heat received and heat rejected may be less than the maximum rates of heat received and heat rejected encountered at other conditions. Thus, another characteristic may be, when Stirling engine 130 is operating under such conditions, to reduce the speed of the pump that circulates the heat transfer fluid in conduits 112 when it is supplying heat to Stirling engine 130, while maintaining an acceptable drop in temperature of the heat transfer fluid as it passes through the hot side of Stirling engine 130, and to reduce the speed of the pump that circulates the water-glycol antifreeze mixture in the heat rejection pathway 134, while maintaining an acceptable rise in temperature of the mixture as it passes through the cold side of Stirling engine 130, and thereby reduce the energy consumed by these pumping actions. These actions may be accomplished directly by engine controller 162.

Even though such operative characteristics may be invoked by conditions not expected by, and by control commands that do not originate within, system controller 160, they all affect the data monitored by system controller 160 in some way. The effects of these operative characteristics are therefore fully observable by system controller 160, which can interpret their meaning by use of mathematical models or decision criteria, and respond accordingly. All such operative characteristics are also deterministic, in that the same inputs or conditions produce the same results or effects. Thus, they affect the data monitored by system controller 160 in a consistent manner, and hence will be interpreted by system controller 160 in a consistent manner, regardless of what mode system 100 is in. There is therefore no need to discriminate between modes solely on the basis of different operative characteristics being present, thus reducing the number of modes system controller 160 has to consider.

System controller 160 bases its decision of what mode to put system 100 into, in part, on these data, as well as data collected from elsewhere in system 100. System controller 160 observes the consequences of this decision, in the form of temperature and other data collected at various points in system 100 and from the building, the amount of electric power generated by Stirling engine 130, the amount energy drawn from an uninterruptible energy source, and other such metrics. System controller 160 may then compare the actual response to an expected response, calculated using mathematical models of the behavior of the components active in the particular mode, and may be allowed to modify the mathematical models or the degree of confidence placed in forecasts, as by Kalman filtering, system parameter identification, or neural network methods, so that predictions by the control algorithm become more accurate.

It is the task of system controller 160 to determine what mode or sequence of modes to put system 100 into such that some benefit described above is maximized. If only past and present factors are used, system controller 160 can at least put system 100 into whichever mode currently maximizes the chosen benefit, subject to interruptions and overrides generated by operative characteristics, such as those described above, that are not under direct control of system controller 160. If forecasts of factors are also used, however, it may be desirable to plan a sequence of modes that, if the forecasts are correct and the sequence is carried out over some time interval, produces a benefit even greater than the benefit realized over the same time interval from using only past and present factors.

Because the more into the future some condition or event is anticipated the less reliable is its forecast, the length of the time interval may be chosen on a probabilistic basis. The time interval could thus be chosen to be just long enough such that the inclusion of a forecast of some condition or event that is to occur at or beyond this time interval makes no statistically significant improvement in the calculation of the benefit.

The time interval may also be chosen on some practical basis. Because the capacity of thermal storage 120 is finite, certain conditions may persist long enough, such as several consecutive cold and cloudy days or several consecutive hot and sunny days which will deplete or saturate respectively thermal storage 120, that knowledge of factors forecast into the future beyond when thermal storage 120 is depleted or saturated may thus not be relevant.

Regardless of the basis for determining the time interval, the time interval need not be constant, need not be the same length for each of the sequences of modes that controller 160 is evaluating, and may be lengthened or shortened by system controller 160 according to the reliability and other statistical properties of the forecasts.

The time interval may be divided into segments. The end of one segment and the beginning of the next is characterized by system controller 160 changing, or at least invoking its authority to decide whether to change, the mode system 100 is currently in, or by changing the set of allowed modes system 100 may put itself into based on data generated by operative characteristics such as those described above. Thus, for example, if it is forecast that the price paid for electricity generated is higher in the late afternoon than it is in the morning, system controller 160 may calculate that those modes that include Stirling engine 130 running may produce a greater benefit if they are not permitted in the morning and are instead permitted only in the late afternoon, beginning at a segment coinciding with when the price paid for electricity increases.

The segments need not be of equal length. They may be shorter when conditions are changing fast, as during morning or evening, or they may be longer when conditions are changing slowly, as between midnight and early morning. Segments used in the forecast part of the calculation need not correspond to when the calculations are performed. Calculations could be performed every hour, for example, but use a segment that is 6 hours long for a period of nighttime that begins, say, 12 or more hours into the future. Length of segments may be determined by system controller 160.

Although segments may be divided conveniently according to the rate at which external data is received, such as once per hour, they should be short enough such that the randomness of forecast factors does not materially affect the calculation. For example, if heat were provided to heating demand 140 early in a segment, the segment should be short enough such that the state or condition of system 100 at the end of the segment would not be materially different from the state or condition if the heat were provided to heating demand 140 late in the segment. Even if the control algorithm does not incorporate forecasts, and instead puts system 100 into the most beneficial mode based only on past and present factors, system controller 160 must still wait some minimum amount of time before again determining what mode to put system 100 into, to allow transients and temporary upsets to system 100 resulting from having put system 100 into the present mode to fully settle out. The segment would have to be at least as long as this minimum amount of time, which could vary and be determined by system controller 160.

System controller 160 need not hold system 100 in a single, particular mode. For certain conditions, such as, for example, partly cloudy days, system controller 160 may recognize the possibility that solar thermal energy collector 110 may not produce a net energy gain when a cloud passes, and may thus allow system 100 to switch freely to some other mode in a predetermined set of modes allowed by system controller 160 for the present segment, based on data generated by operative characteristics such as the difference in temperature of the heat transfer fluid between the outlet and inlet of solar thermal energy collector 110, outside ambient dry bulb temperature, and solar irradiance.

System controller 160 need not hold system 100 in a single, particular mode, or a particular set of modes, for the full duration of a segment. If present or forecast factors change sufficiently severely, or if a significant operative characteristic such as an alarm occurs, system controller 160 may receive and consider such data ahead of the planned update time that would normally be at the end of the segment, and may recalculate the projected benefit and put system 100 into a new or the first of a new set of allowed modes as soon as possible, and not wait until the end of the segment to perform the calculation and make the change. A new time interval and a new series of projected segments may then be recalculated.

Even after identifying certain operative characteristics as described above and recognizing that they can be handled separately by controllers dedicated to them, it emerges that, particularly regarding a system such as system 100 that has the ability to generate electric power, there still exist enough degrees of freedom for allocating the energy produced by solar thermal energy collector 110, as represented by the several modes described above, that it is not immediately obvious which mode or sequence of modes to put system 100 into, particularly over a time interval of multiple time segments, that maximizes some benefit. By separating the control functions that handle the operative characteristics from those that handle the choice of system configuration so as to clearly reveal the modes described above, it is recognized that the problem of maximizing the benefit is thus a dynamic program, wherein the choice of mode or a set of allowed modes corresponds to an integer variable assigned to each mode or set of possible modes that is to be solved for at each segment. Therefore the benefit may be maximized by solving the dynamic program for the integer variable or sequence of integer variables as demonstrated in Tables 1 to 4 herein, each variable of which representing a mode or set of modes system 100 is to be put into at each segment, over the time interval, using computer-based mathematical algorithms for the solution of the dynamic program, as would be found in industry for similar operations research problems in manufacturing and production scheduling, updating the solution at least as often as every segment while calculating the next time interval and its division into segments, the end of the next segment or possibly sooner being when the next update is performed and when the next time interval begins. Ultimately, the task of system controller 160 is to maximize one or a combination of benefits (such as energy savings) by using past, present, and expected future values of ambient temperature, temperatures at various locations within system 100, solar irradiance or other heat availability, building heating demand 140, price information from the electric utility, time of day, and date in the computation of an optimal sequence of modes of operation that system 100 is to be put into over a future, finite time interval, beginning with the current segment of that time interval, then putting system 100 into the configuration that is first in this optimal sequence, and then updating the computation every segment or otherwise periodically. Other variables, integer or continuous, may also be solved for, and not change the underlying principle of this invention.

Where only past and present factors are used by system controller 160, its control algorithm may be straightforward. Without taking into consideration any future knowledge in the form of a forecast, system controller 160 has no basis for doing anything other than maximizing the benefit for the conditions occurring in the present segment. The present and subsequent segments may be just long enough for system 100 to achieve equilibrium after a change in mode, or they may be longer, or the present segment may be of undetermined length following the minimum length necessary for system 100 to achieve equilibrium, whereby the next segment will begin only after a change in mode, precipitated by a change in some external factor or operative characteristic system controller 160 is simply waiting for to occur, such as a certain temperature being attained in the domestic hot water tank. In either situation, the task of system controller 160 is to decide what mode or set of allowed modes to put system 100 into maximizes the benefit in the present segment. In the following first example, it is shown that the method of control taught by this invention, when applied to system 100, has utility even when system controller 160 considers only past and present factors, which is tantamount to solving a dynamic program having only one step.

In this first example, it is assumed that system controller 160 knows, from measuring external factors, that there is solar irradiance and that there is a heating demand 140 to be satisfied. System 100 therefore could be in one of the modes 1, 2, 4, 5, or 8. It is possible that one, some, or all of these modes produce some benefit. It is also possible that none of the modes can produce any benefit. In mode 1, the irradiance may be high enough to power Stirling engine 130, and the temperature of the heat transfer fluid in thermal storage 120 may exceed the minimum temperature required by heating demand 140. In mode 2, the temperature of the heat transfer fluid in thermal storage 120 may be high enough to power Stirling engine 130, and the irradiance may be high enough to supply heat to heating demand 140 at a temperature above its minimum temperature. In mode 4, the irradiance may be high enough to supply heat to thermal storage 120, and may also be high enough to supply heat to heating demand 140 at a temperature above its minimum temperature. In mode 5, the irradiance may be high enough to power Stirling engine 130, and may also be high enough to supply heat to heating demand 140 at a temperature above its minimum temperature. In mode 8, the irradiance may be high enough to supply heat to heating demand 140 at a temperature above its minimum temperature.

One algorithm system controller 160 may implement is to cycle system 100 through each mode 1, 2, 4, 5, and 8, measure the benefit produced in each mode, and then put system 100 into whichever mode produced the maximum benefit. After a certain amount of time has elapsed, or if things change, such as if heating demand 140 becomes satisfied, the algorithm may again cycle through the same or possibly different modes. This algorithm may be acceptable if the minimum length of the segment is short enough to get through all the candidate modes quickly, and if, once found, the mode producing the maximum benefit does not have to be changed often. This algorithm also has the advantage that it compares actual measurements of performance, which may vary with a particular installation or degrade over time.

Alternatively, another algorithm system controller 160 may implement is to provide mathematical models of the behavior of the components and solar thermal energy collector 110 with data currently measured by system controller 160, and then to mathematically calculate and compare the benefit produced by each mode, whereupon system controller 160 then puts system 100 into whichever mode was calculated to produce the maximum benefit. Such models may be known a priori, may be calibrated on site for the particular installation, or may be automatically modified by system controller 160 as it gains experience with the particular installation. After a certain amount of time has elapsed, or if things change, such as if heating demand 140 becomes satisfied, the algorithm may again mathematically calculate and compare the benefit produced by each mode or possibly a set of different modes.

A practical algorithm may have attributes of both methods. For example, if the calculation that shows mode 4 provides the greatest benefit also shows that the temperature rise through solar thermal energy collector 110 is supposed to be 4 degrees C., but which in fact measures only 2 degrees C., then system controller 160 may put system 100 in the mode producing the next highest benefit, or update the model used in the calculation, or issue an alarm.

Table 1 below summarizes the hypothetical consequences of putting system 100 into each of the candidate modes 1, 2, 4, 5, and 8. These consequences could have been learned from or calculated by any of the algorithms described above, or from some other algorithm. The segment lasts only long enough to satisfy heating demand 140, which is assumed to be a fixed amount of heat required, for example, to bring the temperature of a domestic hot water tank back up to its set point temperature, which therefore is assumed not to be a function of how long the segment is. The rate at which heat is supplied to heating demand 140, however, is not assumed to be the same for each mode. The temperature of the heat transfer fluid in thermal storage 120 is assumed to be only marginally above the minimum temperature required by heating demand 140, so heating demand 140 cannot be fully satisfied by thermal storage 120 from operation in mode 1, necessitating the use and hence cost of burning natural gas in the uninterruptible energy source. The Cost of Natural Gas Avoided in Segment is therefore constant for modes 2, 4, 5, and 8, but lower for mode 1.

TABLE 1

|  | Mode | | | | |
| --- | --- | --- | --- | --- | --- |
|  | 1 | 2 | 4 | 5 | 8 |
| Length of Segment to Fulfill Heating Demand, hours | 0.75 | 0.50 | 0.60 | 0.70 | 0.50 |
| Value of Electricity Generated, $/hour | 0.11 | 0.06 | 0.00 | 0.10 | 0.00 |
| Value of Electricity Generated in Segment, $ | 0.0825 | 0.0300 | 0.00 | 0.0700 | 0.00 |
| Cost of Natural Gas Avoided in Segment, $ | 0.09 | 0.15 | 0.15 | 0.15 | 0.15 |
| Cost of Natural Gas Avoided, $/hour | 0.1200 | 0.3000 | 0.2500 | 0.2143 | 0.3000 |
| Value of Benefit, $ | 0.1725 | 0.1800 | 0.1500 | 0.2200 | 0.1500 |
| Rate of Accrual of Value of Benefit, $/hour | 0.2300 | 0.3600 | 0.2500 | 0.3143 | 0.3000 |

The numerical value of two different benefits is calculated for each mode. The first benefit is called Value of Benefit, $, and is the total value of the electricity generated plus the cost of natural gas that did not have to be burned. The second benefit is called Rate of Accrual of Value of Benefit, $/hour, and is the value of the first benefit divided by the amount of time in the segment. The benefit chosen to maximize is the second benefit, Rate of Accrual of Value of Benefit, $/hour, because it is assumed that always choosing the highest rate of accrual in the present segment allows the greatest accrual of money made or cost avoided over time. Other metrics for defining the benefit could be implemented, and could change according to time of day, calendar day, or other inputs. All of these strategies are nonetheless heuristic, and might not be the best to implement if forecasts could be included.

In the following second example, it is shown that the method of control taught by this invention, when applied to system 100, has even greater utility when system controller 160 considers forecast as well as past and present factors, which is tantamount to solving a dynamic program having multiple steps.

Although the passive algorithm described in paragraph [0072] may be used for determining the benefit produced by each mode that system 100 may be put into for the present segment, it cannot be used for determining the benefit produced by each mode for subsequent segments, as this would require somehow creating external factors that have not yet occurred, such as future solar irradiance, that would have to be applied physically to system 100 to see how it responds. The algorithm used in this second example is therefore assumed to be as described in paragraph [0073], enhanced, however, by providing the mathematical models of the behavior of thermal storage 120, Stirling engine 130, heating demand 140 and solar thermal energy collector 110 additionally with forecast data, as well as with past and present data. The algorithm begins by determining which modes may be candidates in a first set of candidate modes. The algorithm then mathematically calculates the benefit produced by each candidate mode, each having a first segment whose length may be determined as in the first example or by some other criteria. Each first segment may be of a different length for each candidate mode, as in the first example, or may be the same length for all candidate modes, provided that the benefit is calculated rationally and consistently for each mode. The algorithm may include the effects of forecast events, such as the expectation that a heating demand 140 will have to be satisfied or that the price paid by the electric utility for any electric power generated will change, that are expected to occur within each first segment. The algorithm retains the results calculated at the end of each first segment for each candidate mode. These results include the temperature of the heat transfer fluid in thermal storage 120, the amount of electricity generated, the amount of energy drawn from the uninterruptible energy source, and the amount of benefit produced, all of which in general will be different for each candidate mode. At the end of the first segment for each candidate mode, the algorithm then determines a second set of candidate modes and repeats the calculation to determine the length of the second segment associated with and the benefit produced by each candidate mode in the second set of candidate modes, using the results obtained at the end of the first segment as the beginning conditions for each calculation, and including any forecast factors expected to occur in the second segments. The calculation is thus performed for each candidate mode in each second set of candidate modes that follow each candidate mode in the first set of candidate modes. The algorithm again retains the results calculated at the end of each second segment for each candidate mode in each second set of candidate modes. This process continues for additional segments until some number of segments has been evaluated, or the length of the segments add up to the time interval, or further calculations cease to make a statistically significant change to the total benefit, or some other halting criterion is reached. Each sequence of modes spanning the time interval may contain a different number of segments, and each sequence of modes may last a unique time interval. The benefit produced by each sequence is now known for each sequence. System controller 160 then puts system 100 into the first mode of whichever sequence was calculated to produce the maximum benefit.

Because uncertainty in the forecast factors and the sensitivity of system performance to variation in the forecast factors may be different for different forecast factors, the benefit may be calculated using maximum likelihood or other statistical methods, including the use of weighting factors applied to the forecast data. Weather forecast data, for example, may have greater uncertainty than building use forecast data, and thus may be weighed less than the building use forecast data. If more than one sequence produces the same or statistically irresolvable maximum benefit, the choice of sequence may be made by other criteria.

Algorithms published in the operations research literature, and others that are available commercially, can identify the optimal sequence without necessarily having to examine every sequence, thus saving computer time in solving a large problem. Knowing the hour of the day, for example, would allow the algorithm not to have to consider modes that involve solar thermal energy collector 110 for segments occurring at night. The algorithm used in this second example, however, does examine every sequence, and is presented for only illustrative purposes, so that the task of identifying which of many possible sequences produces the maximum benefit is made clear.

A numerical evaluation of the benefits produced by the different sequences possible in this second example is carried out through two segments. This is sufficient to illustrate both the operation and the advantage of the invention, while limiting the amount and complexity of the numerical detail in the evaluation. In the first segment, solar irradiance is present, but there are no heating demand 140, leaving modes 3, 6, and 7 as candidates for the first segment. In the second segment, solar irradiance is still present, and the heating demand 140 is now present, leaving modes 1, 2, 4, 5, and 8 as candidates for the second segment. There are thus three possible modes in the first segment, each followed by five possible modes in the second segment. There are thus 3×5, or 15, unique sequences, each producing a possibly unique benefit. To evaluate the benefit, the calculation has to be performed a total of 3+(3×5), or 18, times, to the end of all second segments.

Table 2 is a table theoretically showing the amounts of two, differently defined benefits produced by each of the three candidate modes 3, 6, and 7. A consequence of operation in mode 6 is that the temperature in thermal storage 120 finishes lower than that from operation in mode 3. A consequence of operation in mode 7 is that the temperature in thermal storage 120 finishes higher than that from operation in mode 3.

TABLE 2

|  | Mode | | |
| --- | --- | --- | --- |
|  | 3 | 6 | 7 |
| Length of Segment Before Heating Demand Occurs, hours | 0.30 | 0.30 | 0.30 |
| Value of Electricity Generated, $/hour | 0.10 | 0.11 | 0.00 |
| Value of Electricity Generated in Segment, $ | 0.0300 | 0.0330 | 0.00 |
| Cost of Natural Gas Avoided in Segment, $ | 0.00 | 0.00 | 0.00 |
| Cost of Natural Gas Avoided, $/hour | 0.00 | 0.00 | 0.00 |
| Value of Benefit, $ | 0.0300 | 0.0330 | 0.00 |
| Rate of Accrual of Value of Benefit, $/hour | 0.1000 | 0.1100 | 0.00 |

For the purposes of this second example, the amounts of two, differently defined benefits produced by each of five different configurations of operation possible for the satisfaction of heating demand 140 in the presence of solar irradiance where operation follows mode 3 are assumed to be the same as those presented in the table of Table 1. Table 3 is a table showing the amounts of two, differently defined benefits produced by each of five different configurations of operation possible for the satisfaction of heating demand 140 in the presence of solar irradiance where operation follows mode 6 of Table 2.

TABLE 3

|  | Mode | | | | |
| --- | --- | --- | --- | --- | --- |
|  | 1 | 2 | 4 | 5 | 8 |
| Length of Segment to Fulfill Heating Demand, hours | 0.60 | 0.50 | 0.60 | 0.70 | 0.50 |
| Value of Electricity Generated, $/hour | 0.11 | 0.00 | 0.00 | 0.10 | 0.00 |
| Value of Electricity Generated in Segment, $ | 0.0660 | 0.00 | 0.00 | 0.0700 | 0.00 |
| Cost of Natural Gas Avoided in Segment, $ | 0.00 | 0.15 | 0.15 | 0.15 | 0.15 |
| Cost of Natural Gas Avoided, $/hour | 0.00 | 0.3000 | 0.2500 | 0.2143 | 0.3000 |
| Value of Benefit, $ | 0.0660 | 0.1500 | 0.1500 | 0.2200 | 0.1500 |
| Rate of Accrual of Value of Benefit, $/hour | 0.1100 | 0.3000 | 0.2500 | 0.3143 | 0.3000 |

Table 4 is a table showing the amounts of two, differently defined benefits produced by each of five different configurations of operation possible for the satisfaction of heating demand 140 in the presence of solar irradiance where operation follows mode 7 of Table 2

TABLE 4

| | Mode | | | | |
|---|---|---|---|---|---|
| | 1 | 2 | 4 | 5 | 8 |
| Length of Segment to Fulfill Heating Demand, hours | 0.40 | 0.50 | 0.60 | 0.70 | 0.50 |
| Value of Electricity Generated, $/hour | 0.11 | 0.12 | 0.00 | 0.10 | 0.00 |
| Value of Electricity Generated in Segment, $ | 0.0440 | 0.0600 | 0.00 | 0.0700 | 0.00 |
| Cost of Natural Gas Avoided in Segment, $ | 0.15 | 0.15 | 0.15 | 0.15 | 0.15 |
| Cost of Natural Gas Avoided, $/hour | 0.3750 | 0.3000 | 0.2500 | 0.2143 | 0.3000 |
| Value of Benefit, $ | 0.1940 | 0.2100 | 0.1500 | 0.2200 | 0.1500 |
| Rate of Accrual of Value of Benefit, $/hour | 0.4850 | 0.4200 | 0.2500 | 0.3143 | 0.3000 |

FIG. 13 shows a scheduling chart of every possible sequence, taken through the two segments, where each candidate mode 3, 6, and 7 in the first segment is followed by the candidate modes 1, 2, 4, 5, and 8 in the second segment. The benefit chosen to maximize this time, however, is called Rate of Accrual of Accumulated Value of Benefit, $/hour, and is calculated by dividing the sum of Value of Benefit, $ produced in each of the first and second segments by the sum of Length of Segment to Fulfill Heating Demand, hours (which is just the time interval) from each of the first and second segments, for each sequence of modes. If the algorithm used in the first example, whereby the present mode is chosen solely on the basis of which mode produces the greatest benefit in the present segment, is used with the choices presented in FIG. 13, the sequence of modes 6, 5 would result, producing a projected total benefit at the end of the second segment of 0.2530. Knowing the projected total benefits at the end of all the second segments, however, shows that the sequence of modes 7, 1 produces the maximum benefit 0.2771. A greater benefit is obtained by the end of the second segment, therefore, if system controller 160 first puts system 100 into mode 7, rather than mode 6.

A physical explanation of why the sequence of modes 7, 1 produces a greater benefit than the sequence of modes 6, 5 is that operation in mode 7 during the first segment leaves the temperature in thermal storage 120 at a higher temperature than operation in either of the other two modes of operation possible in the first segment. The benefit produced by operation in mode 1 in the second segment happens to more than compensate for the lack of any benefit produced by operation in mode 7 in the first segment.

Figure 14:
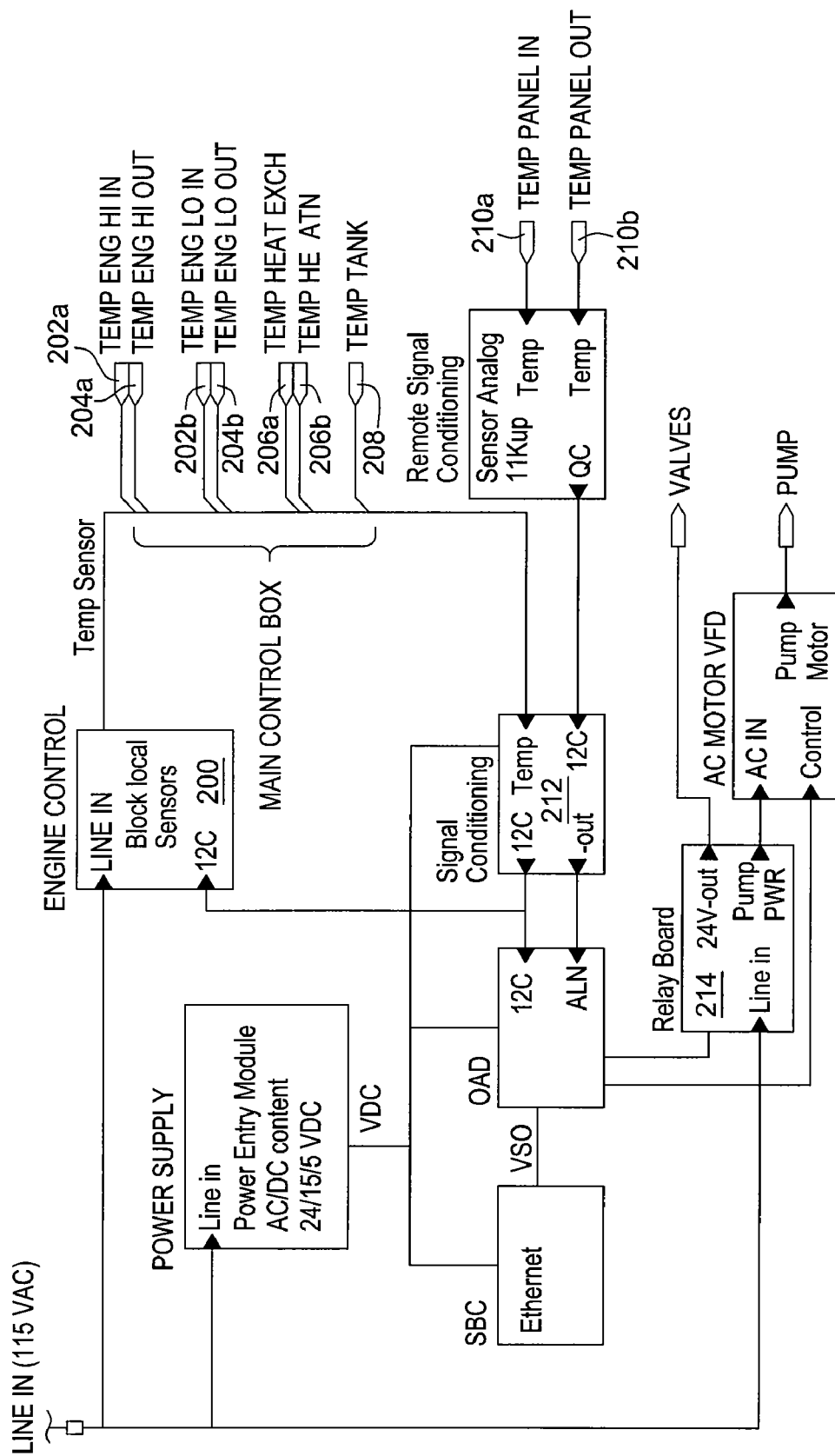
FIG. 14 is a schematic of a controller useful for the control of the system of FIGS. 1 through 12.

FIG. 14 is a diagram of one example of a controller hardware circuit 118 to implement system controller 160 conforming to aspects of the disclosure. Controller hardware circuit 118 includes a microprocessor 200 along with a plurality of components configured to interact with various components of system 100. First, microprocessor 200 includes sensor inputs for Stirling engine 130 hot side temperature sensors 202a and b, Stirling engine 130 cold side temperature sensors 204a and b, heat exchanger 142 sensors 206a and b, thermal storage 120 (FIG. 1) temperature sensor 208, and solar thermal energy collector 100 temperature sensors 210a and b. Such inputs may first pass through signal conditioning blocks 212, which amplify, electrically isolate, filter, linearize, calibrate, or otherwise improve the quality, stability, or robustness of the signals in preparation for their transmission to the inputs to microprocessor 200, Controller hardware circuit 118 further includes relay board 214 operably connected with microprocessor 200. Relay board 214 is configured to receive a control signal from microprocessor 200 to actuate valves 114 and pumps 119. Relay board 214 in turn provides the proper signal to valves 114 and pumps 119. For example, microprocessor 200 may provide some form of control signal to relay board 214, in the form of a bit stream, a data packet, etc, depending on the configuration of relay board 214. Relay board 214 then converts the control signal to the appropriate values for actuating a given valve and/or pump.

Controller hardware circuit 118 may also include various input and output interfaces (not shown) which may receive network data (e.g., an Internet connection), allowing controller hardware circuit 118 to be accessed by a personal computer or other computing device, and the like. For example, controller hardware circuit 118 may include one or more USB ports, Ethernet connections, a serial port, and the like. In this way, system parameters, valve operation, temperature readings, and any form of data collected from system 100, including data collected from engine controller 162, may be accessed. Further, controller hardware circuit 118 may receive inputs besides those from system 100. Further, controller hardware circuit 118 may include diagnostic sequences that a user may view and otherwise control by accessing controller hardware circuit 118 with a personal computer.

The concepts embodied in this invention apply universally to any power generation system having a combination of energy sources, energy sinks, energy stores, thermodynamic engines, and thermodynamic heat pumps. The addition or deletion of a type of component, a change in the number of components, or a change in the form of energy produced, stored, or disbursed, does not change the essential task performed by the invention. The various embodiments, apparatuses, configurations, components, systems, and methods of operation disclosed herein are thus generally exemplary rather than limiting in scope. Although the present invention may be described herein with respect to particular embodiments, apparatuses, configurations, components, systems, and methods of operation, it will be appreciated by those of ordinary skill in the art upon reading this disclosure that certain changes or modifications to the embodiments or their operations may be made without departing from the spirit or scope of the invention. Accordingly, the proper scope of the invention is defined by the appended claims.

The invention claimed is:

1. A system for selective allocation of thermal energy between use to generate electricity or a different use, comprising:
    a heat engine coupled to an electrical generation device;
    a supply of thermal energy
    a thermal storage operatively coupled to said heat engine and said supply of thermal energy; and
    a controller operatively coupled to at least said thermal storage and said heat engine, said controller configured to selectively direct thermal energy from said supply to said thermal storage and/or said heat engine based at least in part on past, present or forecast factors relating to conditions internal and external to the system wherein said controller calculated predictive operational characteristic based at least in part upon the actual operating conditions at a given moment in time and the effect of operating the system in a specific mode based on the conditions of the system upon the end of a period of operation in a mode, to determine an optimal operating paradigm for the system over multiple periods of operation in the same or different modes of operation.

2. The system of claim 1, wherein supply of thermal energy is interruptable.

3. The system of claim 1, further including a heating demand and said controller is further configured to selectively direct thermal energy from said supply of thermal energy to said heating demand.

4. The system of claim 3, wherein said controller is additionally configured to selectively direct thermal energy from said thermal storage to one or more of said heat engine or thermal demand.

5. The system of claim 1, wherein the controller is configured to optimize a user selected benefit from the system, and the controller operates the system in controller selected modes at different times, to effectuate a greatest benefit of the user selectable benefit while one or more modes of operation are not operated at a greatest immediate benefit.

6. The system of claim 1, where the thermal energy supply is solar energy.

7. The system of claim 6, wherein said heat engine is a Stirling engine.

8. The system of claim 7, wherein said controller is operatively coupled to sources of weather information and uses said weather information to select a mode of operation of said system.

9. The system of claim 6, wherein said thermal energy supply includes a solar thermal energy collector.

10. The system of claim 7, wherein said Stirling engine may be driven in reverse to operate as a heat pump.

11. The system of claim 1, further including an electrical storage.

12. The system of claim 1, wherein a benefit is accrued over multiple periods of operation of the system in controller selected modes.

13. The system of claim 1, wherein a benefit is maximized for immediate benefit.

14. The system of claim 1, wherein a benefit is return on investment.

15. The system of claim 1, wherein said controller prioritizes one of a heating demand, a heat engine energy demand and said storage thermal energy demand in selecting a use of thermal energy from said supply of thermal energy.

16. The system of claim 1, wherein said supply of thermal energy is a geothermal source.

17. The system of claim 1, further including a source of electricity other than said heat engine.

18. The system of claim 1, wherein said supply of thermal energy is predicatively interruptible.

19. The system of claim 1, wherein said supply of thermal energy is predicatively interruptible.

20. The system of claim 7, wherein said Stirling engine is coupled to a generator and said generator is configured to generate electricity.

21. A method of prioritizing a use of thermal energy as among more than one demand for the thermal energy, comprising:
providing a controller;
predicting with the controller the likely benefit to use the thermal energy for each of the demands over a first period of time;
determining, with the controller, a status of at least one demand;
predicting with the controller the likely benefit to use the thermal energy for each of the demands over a second period of time;
determining a maximum benefit based upon a benefit for each demand in both the first and the second periods of time, where the second period of time sequentially follows the first period of time;
sequentially directing the thermal energy to the demands determined to result in in a greatest benefit summed over both the first and the second sequential periods of time wherein said controller calculates predictive operational characteristic based at least in part upon an actual operating conditions at a given moment in time and an effect of operating a system in a specific mode based on the actual operating conditions of the system upon an end of a period of operation in a mode, to determine an optimal operating paradigm for the system over multiple periods of operation in the same or different modes of operation.

22. The method of claim 21, wherein the at least one demand is a heating demand.

23. The method of claim 21, wherein the at least one demand is an electrical demand.

24. The method of claim 21, further including the step of comparing the benefit of satisfying each of several demands.

25. The method of claim 24, further including the step s of defining a series of sequences, and calculating a benefit for each of several potential demands in each of the plurality if sequences.

* * * * *

UNITED STATES PATENT AND TRADEMARK OFFICE
CERTIFICATE OF CORRECTION

| | | |
|---|---|---|
| PATENT NO. | : 8,224,495 B2 | |
| APPLICATION NO. | : 12/536278 | |
| DATED | : July 17, 2012 | |
| INVENTOR(S) | : Samuel P. Weaver et al. | |

It is certified that error appears in the above-identified patent and that said Letters Patent is hereby corrected as shown below:

Column 22, Claim 1, line 63, please delete "calculated" and replace with "calculates".

Column 24, Claim 21, line 27, please delete "in in a" and replace with "in a".

Column 24, Claim 25, line 43, please delete "step s" and replace with "steps".

Column 24, Claim 25, line 45, please delete "if" and replace with "of".

Signed and Sealed this
Twenty-seventh Day of November, 2012

David J. Kappos
*Director of the United States Patent and Trademark Office*